(12) United States Patent
Won et al.

(10) Patent No.: US 10,964,962 B2
(45) Date of Patent: Mar. 30, 2021

(54) METHOD FOR DIAGNOSING WATER-CONTAINING STATE OF FUEL CELL STACK

(71) Applicants: Hyundai Motor Company, Seoul (KR); Kia Motors Corporation, Seoul (KR)

(72) Inventors: Sang Bok Won, Seoul (KR); Ki Chang Kim, Seoul (KR); Sung Ho Yang, Ansan (KR); Young Pin Jin, Yongin (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 460 days.

(21) Appl. No.: 15/822,838

(22) Filed: Nov. 27, 2017

(65) Prior Publication Data

US 2019/0131638 A1    May 2, 2019

(30) Foreign Application Priority Data

Oct. 26, 2017    (KR) .................. 10-2017-0140467

(51) Int. Cl.
  *H01M 8/0438*   (2016.01)
  *H01M 8/04537*  (2016.01)
  *H01M 8/04828*  (2016.01)

(52) U.S. Cl.
  CPC ..... *H01M 8/0438* (2013.01); *H01M 8/04544* (2013.01); *H01M 8/04641* (2013.01); *H01M 8/04828* (2013.01)

(58) Field of Classification Search
  None
  See application file for complete search history.

(56) References Cited

U.S. PATENT DOCUMENTS 8,034,498 B2    10/2011   Manabe et al.
2005/0048336 A1*  3/2005  Takebe .............. H01M 8/04223
                                                     429/413

FOREIGN PATENT DOCUMENTS

JP           5811958 B2 *  11/2015

OTHER PUBLICATIONS

JP5811958 B2—Machine translation (Year: 2012).*

* cited by examiner

*Primary Examiner* — Haroon S. Sheikh
(74) *Attorney, Agent, or Firm* — Mintz Levin Cohn Ferris Glovsky and Popeo, P.C.; Peter F. Corless

(57) ABSTRACT

A method for diagnosing a water-containing state of a fuel cell stack includes steps of: applying an alternating current (AC) signal having a predetermined frequency to the fuel cell stack to calculate each of an electrolyte membrane impedance, an anode impedance, and a cathode impedance from an output voltage and an output current of the fuel cell stack corresponding to the AC signal; and diagnosing the water-containing state of the fuel cell stack on the basis of the electrolyte membrane impedance, the anode impedance, and the cathode impedance.

13 Claims, 12 Drawing Sheets

METHOD FOR DIAGNOSING WATER-CONTAINING STATE OF FUEL CELL STACK

CROSS-REFERENCE TO RELATED APPLICATION

This application claims under 35 U.S.C. § 119(a) the benefit of Korean Patent Application No. 10-2017-0140467, filed on Oct. 26, 2017 in the Korean Intellectual Property Office, the entire contents of which are incorporated by reference herein.

BACKGROUND

(a) Technical Field

The present disclosure relates to a method for diagnosing a water-containing state of a fuel cell stack.

(b) Description of the Related Art

A fuel cell stack, which is a main power supply of a fuel cell system, is a device generating electricity through an oxidation-reduction reaction between hydrogen and oxygen.

High purity hydrogen is supplied from a hydrogen storing tank to an anode of the fuel cell stack, and air in the atmosphere is introduced into a cathode of the fuel cell stack by an air compressor or another air supplying device.

In the anode, an oxidation reaction of hydrogen is performed, such that protons and electrons are generated, and the protons and the electrons generated as described above are moved to the cathode through an electrolyte membrane and a separator. In the cathode, a reduction reaction in which the protons and the electrons moved from the anode and oxygen in the air supplied by the air supplying device participate is performed, such that water and electric energy by a flow of the electrons are simultaneously generated.

When the fuel cell stack becomes dry or wet as compared with an appropriate level, a phenomenon in which movement of a reaction gas through pores such as a gas diffusion layer, the anode, the cathode, and the like, is limited or the electrolyte membrane is damaged occurs, such that performance and durability of the fuel cell stack may be deteriorated.

However, a fuel cell system according to the related art does not include a component that may accurately diagnose a water-containing state of the fuel cell stack. Therefore, the fuel cell system according to the related art has a problem that performance and durability of the fuel cell stack are deteriorated due to drying or flooding of the fuel cell stack.

SUMMARY

An aspect of the present disclosure provides a method for diagnosing a water-containing state of a fuel cell stack capable of accurately diagnosing the water-containing state of the fuel cell stack.

An aspect of the present disclosure also provides a method for diagnosing a water-containing state of a fuel cell stack capable of individually diagnosing water-containing states of an electrolyte membrane, an anode, and a cathode.

An aspect of the present disclosure also provides a method for diagnosing a water-containing state of a fuel cell stack capable of controlling a water content of the fuel cell stack at an appropriate level depending on a driving aspect of a fuel cell system.

According to an exemplary embodiment of the present disclosure, a method for diagnosing a water-containing state of a fuel cell stack includes: a step (A) of applying an alternating current (AC) signal having a predetermined frequency to the fuel cell stack to calculate each of an electrolyte membrane impedance, an anode impedance, and a cathode impedance from an output voltage and an output current of the fuel cell stack corresponding to the AC signal; and a step (B) of diagnosing the water-containing state of the fuel cell stack on the basis of the electrolyte membrane impedance, the anode impedance, and the cathode impedance.

The step (A) may include a step (A1) of measuring a first output voltage and a first output current of the fuel cell stack in a state in which a first AC signal having a predetermined first frequency is applied to the fuel cell stack and setting a first impedance of the fuel cell stack derived from the first output voltage and the first output current to the electrolyte membrane impedance.

The first frequency may be determined so that a ratio of the anode impedance and the cathode impedance to the first impedance is less than a predetermined reference ratio.

The step (A) may further include a step (A2) of measuring a second output voltage and a second output current of the fuel cell stack in a state in which a second AC signal having a second frequency lower than the first frequency is applied to the fuel cell stack and setting an impedance value calculated by subtracting the electrolyte membrane impedance derived in the step (A1) from a second impedance of the fuel cell stack derived from the second output voltage and the second output current to the anode impedance.

The second frequency may be determined so that a ratio of the cathode impedance to the second impedance is less than a predetermined reference ratio.

The method for diagnosing a water-containing state of a fuel cell stack may further include, before the step (A2), a step (C) of controlling the second frequency so that the ratio of the cathode impedance to the second impedance is less than the reference ratio, wherein the step (C) includes: a step (C1) of supplying air to the cathode by a predetermined standard flow rate or controlling a pressure of the cathode to be a predetermined standard pressure and at the same time, applying the second AC signal having the second frequency to the fuel cell stack to measure the anode impedance; a step C2) of supplying the air to the cathode by a flow rate less than the standard flow rate or controlling the pressure of the cathode to be a pressure lower than the standard pressure and at the same time, applying the second AC signal having the second frequency to the fuel cell stack to measure the anode impedance; and a step (C3) of increasing the second frequency by a predetermined reference value when a difference between the anode impedance measured in the step (C2) and the anode impedance measured in the step (C1) exceeds a predetermined reference ratio.

In the step (C3), the second frequency may be maintained as it is when the difference between the anode impedance measured in the step (C2) and the anode impedance measured in the step (C1) is the reference ratio or less.

The step (A) may further include a step (A3) of measuring a third output voltage and a third output current of the fuel cell stack in a state in which a third AC signal having a third frequency lower than the second frequency is applied to the fuel cell stack and setting an impedance value calculated by subtracting the electrolyte membrane impedance derived in the step (A1) and the anode impedance derived in the step (A2) from a third impedance of the fuel cell stack derived from the third output voltage and the third output current to the cathode impedance.

The third frequency may be determined so that a ratio of the cathode impedance to the third impedance is a predetermined reference ratio or more.

The step (B) may include: a step (B1) of deciding whether or not the electrolyte membrane impedance exceeds a predetermined reference electrolyte membrane impedance; and a step (B2) of deciding that the fuel cell stack is in a dry state in the case in which the electrolyte membrane impedance exceeds the reference electrolyte membrane impedance.

The step (B2) may be performed by deciding that the cathode is in a dry-cathode bias state in the case in which the anode impedance exceeds a predetermined reference anode impedance and the cathode impedance is a predetermined reference cathode impedance or less.

The method for diagnosing a water-containing state of a fuel cell stack may further include a step (D) of controlling the fuel cell stack so that the cathode is flooded in the case in which the cathode is in the dry-cathode bias state.

The step (B2) may be performed by deciding that the anode is in a dry-anode bias state in the case in which the anode impedance is a predetermined reference anode impedance or less and the cathode impedance exceeds a predetermined reference cathode impedance.

The method for diagnosing a water-containing state of a fuel cell stack may further include a step (E) of controlling the fuel cell stack so that the anode is flooded in the case in which the anode is in the thy-anode bias state.

The step (B) may further include: a step (B3) of deciding whether or not a summed impedance calculated by summing the anode impedance and the cathode impedance exceeds a predetermined reference summed impedance in the case in which the electrolyte membrane impedance is the reference electrolyte membrane impedance or less; and a step (B4) of deciding that the fuel cell stack is in a flood state in the case in which the summed impedance exceeds the reference summed impedance.

The step (B) may further include a step (B5) of deciding that the fuel cell stack is in an optimal state in the case in which the summed impedance is the reference summed impedance or less.

The step (B5) may be performed by deciding that the cathode is in a flood-cathode bias state in the case in which the anode impedance exceeds a predetermined reference anode impedance and the cathode impedance is a predetermined reference cathode impedance or less.

The method for diagnosing a water-containing state of a fuel cell stack may further include a step (F) of controlling the fuel cell stack so that the cathode becomes dry in the case in which the cathode is in the flood-cathode bias state.

The step (B5) may be performed by deciding that the anode is in a flood-anode bias state in the case in which the anode impedance is a predetermined reference anode impedance or less and the cathode impedance exceeds a predetermined reference cathode impedance.

The method for diagnosing a water-containing state of a fuel cell stack may further include a step (G) of controlling the fuel cell stack so that the anode becomes dry in the case in which the anode is in the flood-anode bias state.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
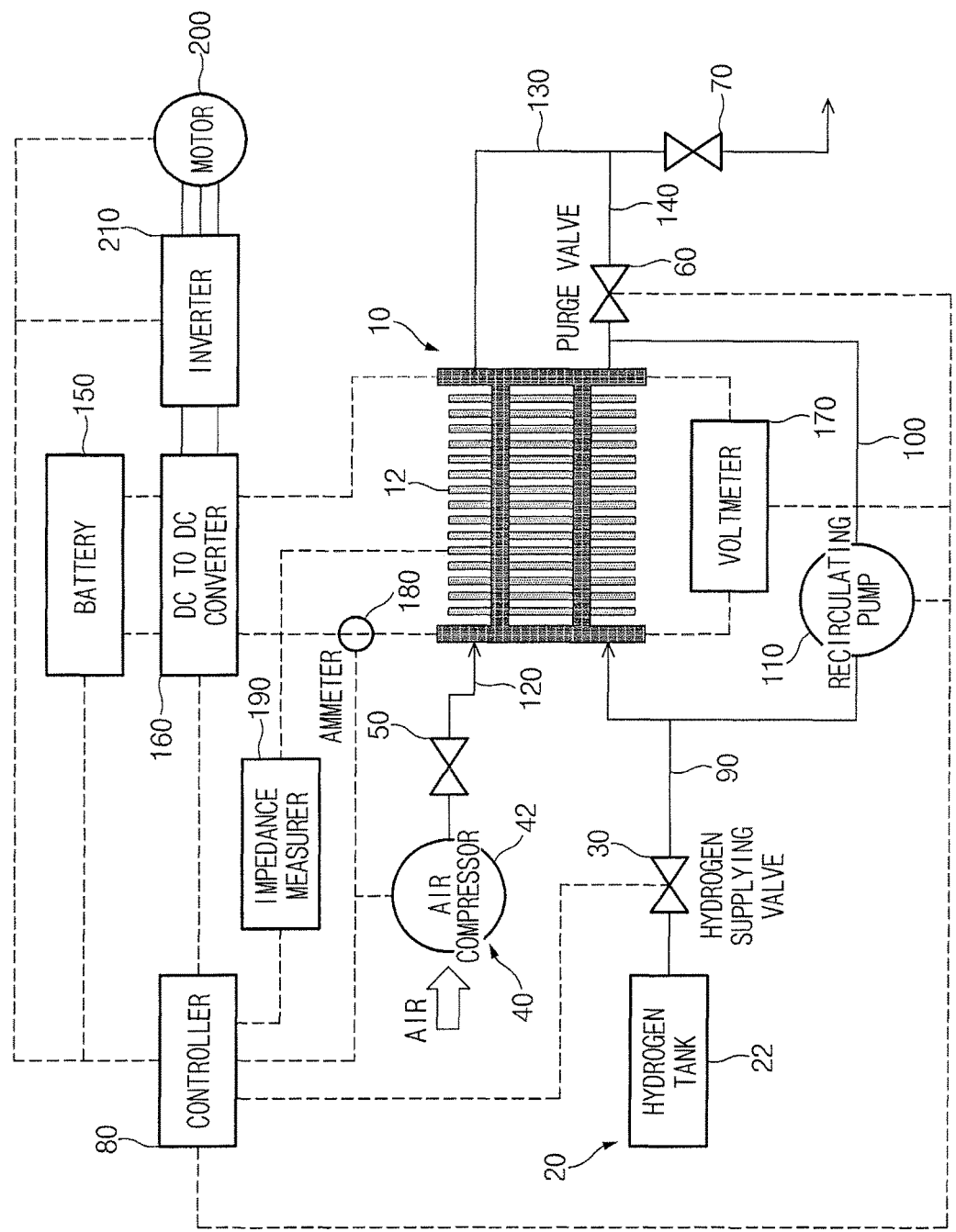
FIG. 1 is a view illustrating a schematic configuration of a fuel cell system.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. It is to be noted that in applying reference numerals to components of the accompanying drawings, the same components will be denoted by the same reference numerals even though they are illustrated in different drawings. Further, in describing exemplary embodiments of the present disclosure, well-known constructions or functions will not be described in detail in the case in which it is decided that they may unnecessarily obscure the understanding of exemplary embodiments of the present disclosure.

Terms 'first', 'second', A, B, (a), (b), and the like, will be used in describing components of exemplary embodiments of the present disclosure. These terms are used only in order to distinguish any component from other components, and features, sequences, or the like, of corresponding components are not limited by these terms. In addition, unless defined otherwise, all the terms used in the present specification, including technical and scientific terms, have the same meanings as meanings that are generally understood by those skilled in the art to which the present disclosure pertains. It should be interpreted that terms defined by a generally used dictionary are identical with the meanings within the context of the related art, and they should not be ideally or excessively formally interpreted unless the context clearly dictates otherwise.

Figure 2:
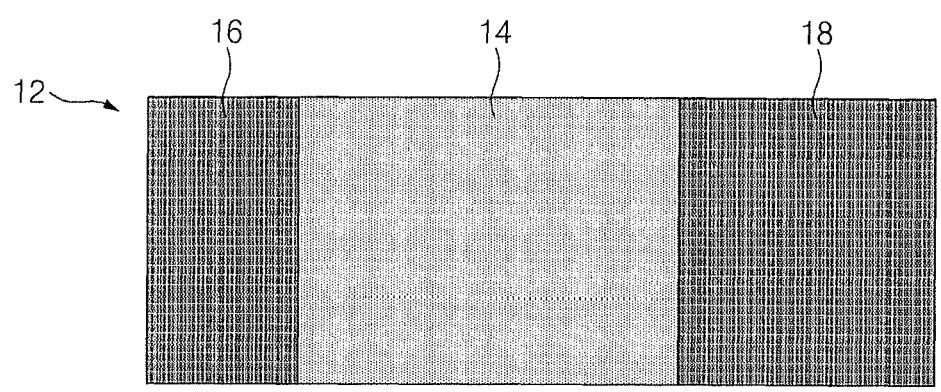
FIG. 2 is a conceptual diagram illustrating a unit cell of a fuel cell stack.
Figure 3:
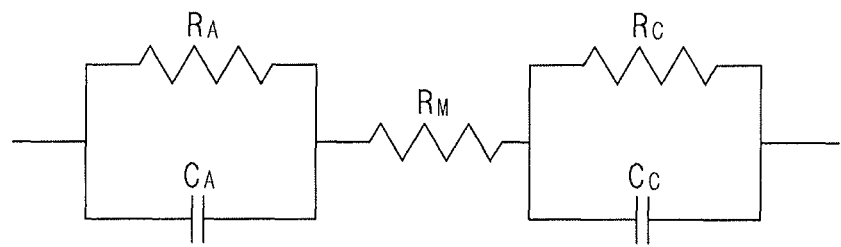
FIG. 3 is a circuit diagram illustrating an equivalent circuit of the fuel cell stack illustrated in FIG. 2.
Figure 4:
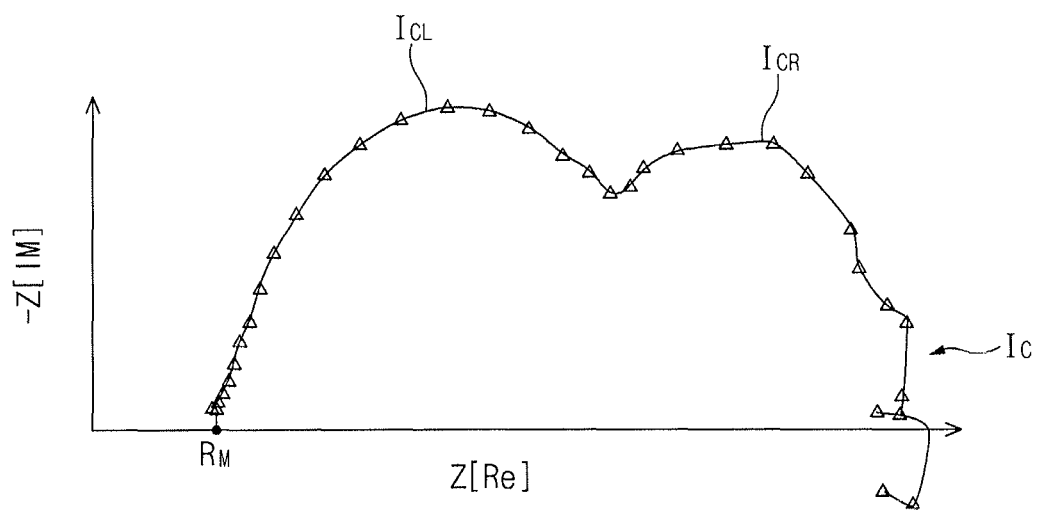
FIG. 4 is a Nyquist plot of the equivalent circuit illustrated in FIG. 3.

FIG. 1 is a view illustrating a schematic configuration of a fuel cell system, FIG. 2 is a conceptual diagram illustrating a unit cell of a fuel cell stack, FIG. 3 is a circuit diagram illustrating an equivalent circuit of the fuel cell stack illustrated in FIG. 2, and FIG. 4 is a Nyquist plot of the equivalent circuit illustrated in FIG. 3.

The present disclosure relates to a method for diagnosing a water-containing state of a fuel cell stack 10 included in a fuel cell system 1. Hereinafter, a schematic configuration of the fuel cell system 1 will be first described with reference to FIG. 1.

Referring to FIG. 1, the fuel cell system 1 may include the fuel cell stack 10, a hydrogen supplying device 20, a hydrogen supplying valve 30, an air supplying device 40, an air supplying valve 50, a purge valve 60, an air discharging valve 70, a controller 80, and the like. A type of apparatus to which the fuel cell system 1 may be applied is not particularly limited. For example, the fuel cell system 1 may be mounted in a fuel cell vehicle that may be driven using electric energy generated from the fuel cell stack 10 as a power source of a motor 200.

First, as illustrated in FIG. 1, the fuel cell stack 10 may include a plurality of unit cells 12 stacked in a predetermined stacked direction. As illustrated in FIG. 2, each of the unit cells 12 may have an electrolyte membrane 14, an anode 16 in which protons and electrons are generated by performing an oxidation reaction of hydrogen supplied by a hydrogen supplying device 20 to be described below, a cathode 18 in which electric energy and water are generated by performing a reduction reaction in which the protons and the electrons each moved from the anode 16 and oxygen in the air supplied by an air supplying device 40 to be described below participate, and the like. Hereinafter, the electrolyte membranes 14 included in all the unit cells 12 will be commonly called an electrolyte membrane 14, the anodes 16 included in all the unit cells 12 will be commonly called an anode 16, and the cathodes 18 included in all the unit cells 12 will be commonly called a cathode 18.

Such a fuel cell stack 10 may be represented by an equivalent circuit having a resistance component and a reactance component. For example, as illustrated in FIG. 3, the electrolyte membrane 14 may be represented by a resistance component $R_M$, the anode 16 may be represented by a resistance component $R_A$ and a capacitance component $C_A$ connected to each other in parallel, and the cathode 18 may be represented by a resistance component $R_C$ and a capacitance component $C_C$ connected to each other in parallel. According to the equivalent circuit of the fuel cell stack 10, as represented by the following Equations 1 to 4, an impedance $Z_S$ of the fuel cell stack 10 may be calculated by summing an electrolyte membrane impedance $Z_M$, an anode impedance $Z_A$, and a cathode impedance $Z_C$.

$$Z_M(\omega) = R_M \quad \text{[Equation 1]}$$

$$Z_A(\omega) = \frac{R_A}{1 + i \cdot \omega \cdot R_A \cdot C_A} \quad \text{[Equation 2]}$$

$$Z_C(\omega) = \frac{R_C}{1 + i \cdot \omega \cdot R_C \cdot C_C} \quad \text{[Equation 3]}$$

$$Z_S(\omega) = Z_M(\omega) + Z_A(\omega) + Z_C(\omega) \quad \text{[Equation 4]}$$

In addition, according to the equivalent circuit of the fuel cell stack 10, the impedance $Z_S$ of the fuel cell stack 10 is varied depending on a frequency of an alternating current (AC) signal applied to the fuel cell stack 10. Therefore, as illustrated in FIG. 4, the frequency of the AC signal applied to the fuel cell stack 10 may be varied to individually calculate the impedances $Z_S$ of the fuel cell stack 10 for each of frequency components, resulting in derivation of an equivalent circuit impedance curve $I_C$ of the fuel cell stack 10.

Next, the hydrogen supplying device 20 may include a hydrogen tank 22 in which hydrogen is stored. The hydrogen tank 22 may be connected to the fuel cell stack 10 through a hydrogen supplying line 90 to supply hydrogen to the anode 16. Remaining hydrogen except hydrogen participating in an electricity generating reaction among hydrogen supplied to the anode 16 described above may be guided to the hydrogen supplying line 90 through a hydrogen recirculating line 100 and be resupplied to the anode 16. A recirculating pump 110 that may pump hydrogen flowing through the hydrogen recirculating line 100 toward the hydrogen supplying line 90 may be installed on the hydrogen recirculating line 100.

Next, the hydrogen supplying valve 30 may be installed on the hydrogen supplying line 90, and control a flow rate of hydrogen supplied to the anode 16 through a control of an opening level.

Next, the air supplying device 40 may include an air compressor 42 that may suck air in the atmosphere and compress the sucked air. The air compressor 42 may be connected to the cathode 18 through an air supplying line 120 to supply air to the cathode 18. Remaining air except for oxygen participating in an electricity generating reaction among the air supplied to the cathode 18 may be discharged to the outside along an air discharging line 130.

Next, the air supplying valve 50 may be installed on the air supplying line 120, and control a flow rate of air supplied to the cathode 18 through a control of an opening level.

Next, the purge valve 60 is provided to discharge hydrogen passing through the hydrogen recirculating line 100 to the outside. To this end, the hydrogen recirculating line 100 is connected to the air discharging line 130 by a hydrogen purge line 140, and the purge valve 60 is installed on the hydrogen purge line 140. The purge valve 60 may be selectively opened in the case in which a predetermined purge condition is satisfied. The purge condition is not particularly limited. For example, the purge condition may be whether or not a hydrogen concentration of the anode 16 is a predetermined reference concentration or less. In the case in which the purge valve 60 is opened, hydrogen and other gases flowing through the hydrogen recirculating line 100 may be transferred to the air discharging line 130 through the hydrogen purge line 140 and be then discharged together with the air flowing through the air discharging line 130 to the outside.

Then, the air discharging valve 70 may be installed on the air discharging line 130, and control discharge amounts of air, hydrogen, and other gases flowing through the air discharging line 130 and a pressure of the cathode 18 through a control of an opening level.

Then, the controller 80 is provided to control driving of various components included in the fuel cell system 1.

Referring to FIG. 1, the fuel cell system 1 may further include a battery 150, a direct current (DC) to DC converter 160, a voltmeter 170, an ammeter 180, an impedance measurer 190, and the like.

The battery 150 is a secondary battery that is rechargeable. A type of secondary battery that may be used as the battery 150 is not particularly limited. For example, the battery 150 may be a nickel metal hydrogen battery. As illustrated in FIG. 1, the battery 150 may be inserted into an electric discharge path of the fuel cell stack so as to be connected to the fuel cell stack 10 in parallel. The battery 150 may be charged with a surplus of output power of the fuel cell stack 10, regenerative power of the motor 200, and the like. Output power of the battery 150 may be supplied to auxiliary machinery, the motor 200, and the like, if necessary.

The DC to DC converter 160 is connected to an output stage of the fuel cell stack 10 in parallel. The DC to DC converter 160 may convert the output power of the fuel cell stack 10 in a DC to DC manner and supply the converted power as charging power to the battery 150, and may convert the output power of the battery 150 in a DC to DC manner and supply the converted power to the auxiliary machinery, the motor 200, and the like. In addition, the DC to DC converter 160 may convert the regenerative power generated from the motor 200 at the time of regenerative braking and supply the converted power as charging power to the battery 150. Meanwhile, an inverter 210 converting DC power supplied from the DC to DC converter 160 into three-phase AC power in a DC to AC manner and transferring the three-phase AC power to the motor 200 or converting three-phase AC power supplied from the motor 200 into DC power in an AC to DC manner and transferring the DC power to the DC to DC converter 160 may be installed between the DC to DC converter 160 and the motor 200.

The voltmeter 170 may detect an output voltage of the fuel cell stack 10 and transfer the detected output voltage to the controller 80, and the ammeter 180 may detect an output current of the fuel cell stack 10 and transfer the detected output current to the controller 80. Since the voltmeter 170 and the ammeter 180 have the same structures as those of a voltmeter and an ammeter generally used in a fuel cell system, a more detailed description for the voltmeter 170 and the ammeter 180 will be omitted.

The impedance measurer 190 is provided to measure the impedance $Z_S$ of the fuel cell stack 10. For example, the impedance measurer 190 may apply an AC signal having a predetermined frequency to the fuel cell stack 10, and then calculate the impedance $Z_S$ of the fuel cell stack 10 corresponding to a frequency component of the AC signal from the output voltage and the output current of the fuel cell stack 10 each detected by the voltmeter 170 and the ammeter 180.

Figure 5:
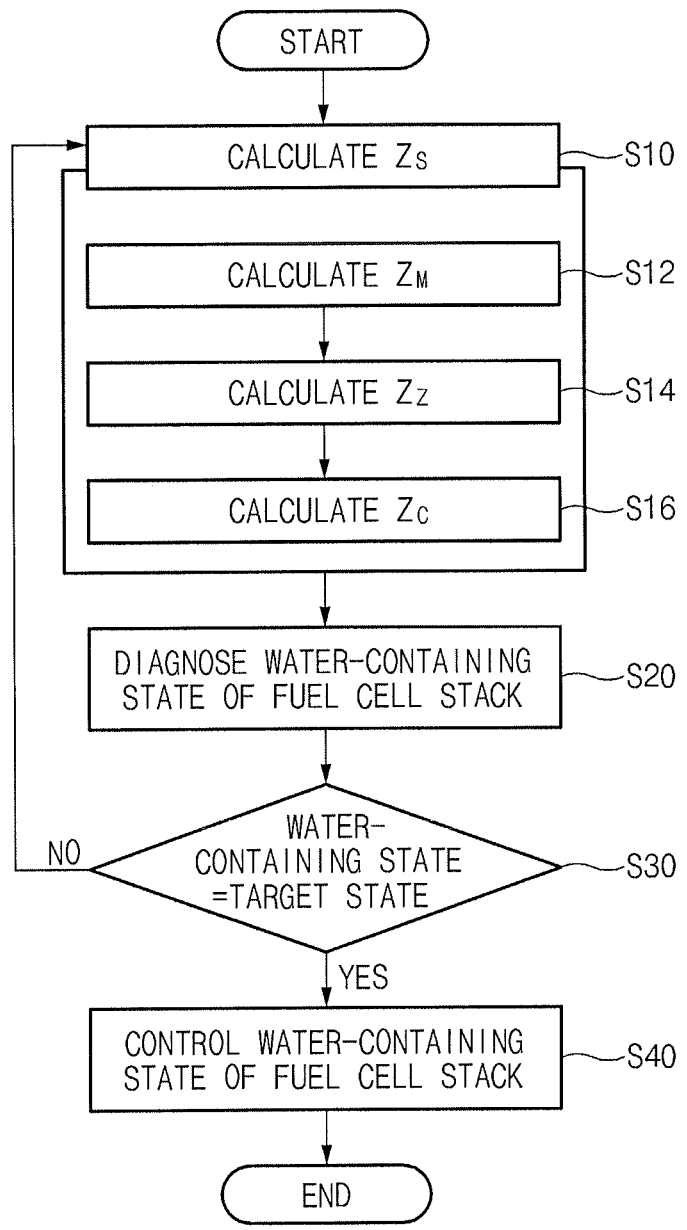
FIG. 5 is a flow chart for describing a method for diagnosing a state of a fuel cell stack according to an exemplary embodiment of the present disclosure.

FIG. 5 is a flow chart for describing a method for diagnosing a state of a fuel cell stack according to an exemplary embodiment of the present disclosure.

Referring to FIG. 5, the method for diagnosing a state of a fuel cell stack 10 according to an exemplary embodiment of the present disclosure may include a step (S10) of applying the AC signal having the predetermined frequency to the fuel cell stack 10 to calculate each of the electrolyte membrane impedance $Z_M$, the anode impedance $Z_A$, and the cathode impedance $Z_C$ from the output voltage and the output current of the fuel cell stack 10 corresponding to the frequency component of the AC signal; a step (S20) of diagnosing a water-containing state of the fuel cell stack 10 on the basis of the electrolyte membrane impedance $Z_M$, the anode impedance $Z_A$, and the cathode impedance $Z_C$; a step (S30) of comparing the water-containing state of the fuel cell stack 10 and a target state of the fuel cell stack 10 with each other; a step (S40) of controlling the fuel cell system 1 using fuel cell stack 10 so that the water-containing state of the fuel cell stack 10 is controlled to be the target state in the case in which the water-containing state of the fuel cell stack 10 and the target state are different from each other, and the like.

Figure 6:
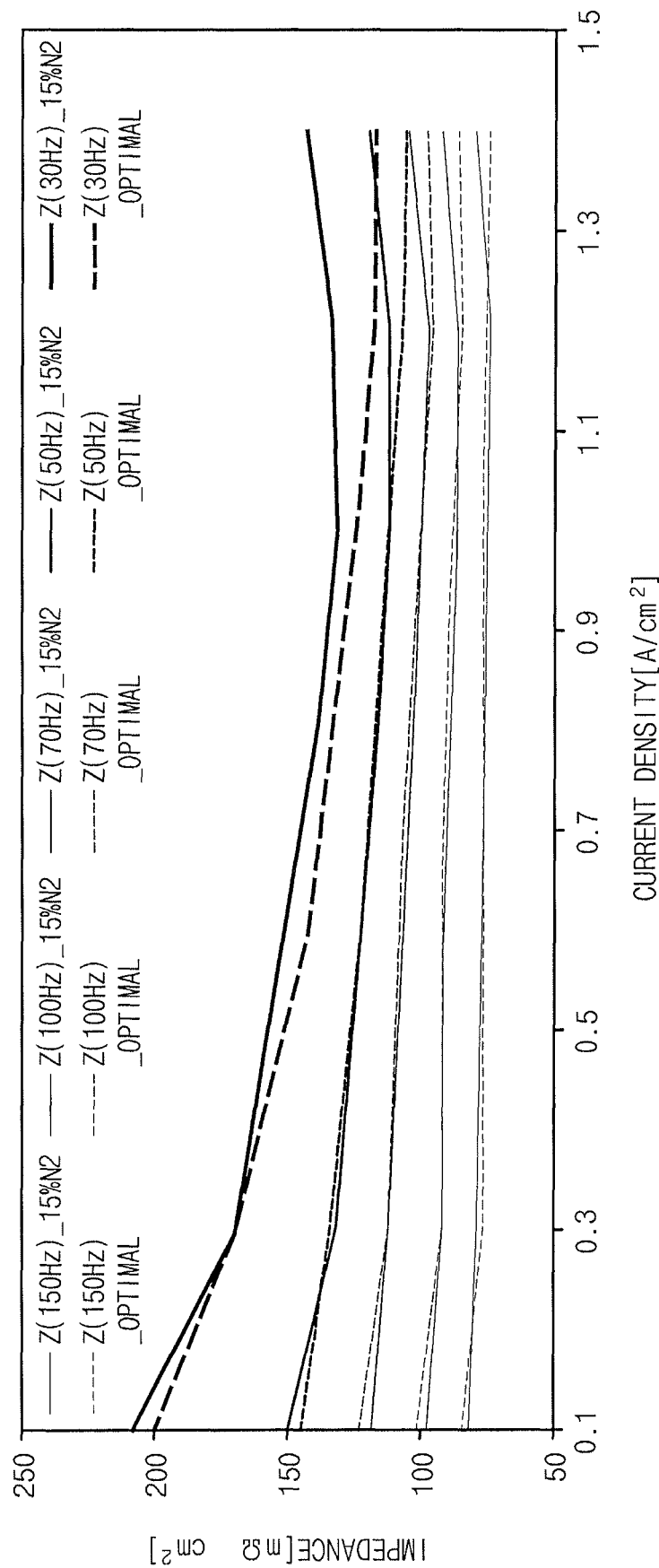
FIG. 6 is a graph for describing a correlation between a frequency of an alternating current (AC) signal applied to the fuel cell stack and a cathode impedance.

FIG. 6 is a graph for describing a correlation between a frequency of an AC signal applied to the fuel cell stack and a cathode impedance.

First, as illustrated in FIG. 5, the step S10 may include a step (S12) of applying a first AC signal having a predetermined first frequency $\omega_1$ to the fuel cell stack 10 to measure the electrolyte membrane impedance $Z_M$, a step (S14) of applying a second AC signal having a second frequency $\omega_2$ lower than the first frequency $\omega_1$ to the fuel cell stack 10 to measure the anode impedance $Z_A$, and a step (S16) of applying a third AC signal having a third frequency $\omega_3$ lower than the second frequency $\omega_2$ to the fuel cell stack 10 to measure the cathode impedance $Z_C$.

The step S12 may be performed by measuring a first output voltage and a first output current of the fuel cell stack 10 in a state in which the first AC signal having the first frequency $\omega_1$ is applied to the fuel cell stack 10 and setting a first impedance $Z_{S1}$ of the fuel cell stack 10 derived from the first output voltage and the first output current to the electrolyte membrane impedance $Z_M$.

As described above, the electrolyte membrane 14 includes only the resistance component $R_M$, and the anode 16 and the cathode 18 include the resistance components $R_A$ and $R_C$ and the capacitance components $C_A$ and Cc connected to each other in parallel, respectively.

Therefore, when the frequency of the AC signal applied to the fuel cell stack 10 becomes significantly high, the anode impedance $Z_A$ and the cathode impedance $Z_C$ becomes low so as to approximate to 0 mΩ·cm², such that the electrolyte membrane impedance $Z_M$ occupies most of the impedance $Z_S$ of the fuel cell stack 10. Referring to FIG. 4, in the case in which the frequency of the AC signal applied to the fuel cell stack 10 is increased, the impedance $Z_S$ of the fuel cell stack 10 shows an aspect in which it is generally decreased while moving to a left region of the Nyquist plot along the equivalent circuit impedance curve $I_C$, and only the resistance component $R_M$ of the electrolyte membrane 14 finally remains in the impedance $Z_S$ of the fuel cell stack 10.

The first frequency $\omega_1$ may be determined so that a ratio of the anode impedance $Z_A$ and the cathode impedance $Z_C$ to the first impedance $Z_{S1}$ of the fuel cell stack 10 is less than a predetermined reference ratio, using such a principle. That is, the first frequency $\omega_1$ is determined so that the anode impedance $Z_A$ and the cathode impedance $Z_C$ substantially become 0 mΩ·cm². For example, the first frequency $\omega_1$ may be 3 kPa. When the first frequency $\omega_1$ is determined as described above, the first impedance $Z_{S1}$ of the fuel cell stack 10 and the electrolyte membrane impedance $Z_M$ may become equal to each other, as represented by Equation 5.

$$Z_{S1}(\omega_1)=Z_M(\omega_1)+Z_A(\omega_1)+Z_C(\omega_1) \approx Z_M(\omega_1) \quad \text{[Equation 5]}$$

The first frequency $\omega_1$ may be pre-stored in a storage of the controller 80. Therefore, at the time of performing the step S12, the controller 80 controls the impedance measurer 190 so that the first AC signal having the first frequency $\omega_1$ is applied to the fuel cell stack 10. In this case, the impedance measurer 190 may derive the first impedance $Z_{S1}$ of the fuel cell stack 10 from the first output voltage and the first output current of the fuel cell stack 10 each detected by the voltmeter 170 and the ammeter 180, and then set the first impedance $Z_{S1}$ of the fuel cell stack 10 to the electrolyte membrane impedance $Z_M$. Hereinafter, the electrolyte membrane impedance $Z_M$ derived in the step S12 as described above will be called an 'HFR'.

The step S14 may be performed by measuring a second output voltage and a second output current of the fuel cell stack 10 in a state in which the second AC signal having the second frequency $\omega_2$ lower than the first frequency $\omega_1$ is applied to the fuel cell stack 10 and setting an impedance value calculated by subtracting the electrolyte membrane impedance HFR derived in the step S12 from a second impedance $Z_{S2}$ of the fuel cell stack 10 derived from the second output voltage and the second output current of the fuel cell stack 10 to the anode impedance $Z_A$.

Generally, the cathode impedance $Z_C$ becomes high as a concentration of oxygen included in the air supplied to the cathode 18 becomes low. The plots illustrated in FIG. 6 represent results of an experiment performed in consideration of a correlation between the cathode impedance $Z_C$ and a concentration of oxygen. The plots illustrated in FIG. 6 represent result values of the impedances $Z_S$ of the fuel cell stack 10 individually measured by applying AC signals having different frequencies to the fuel cell stack 10 in a state in which the air in the atmosphere is optimally supplied to the cathode 18, and result values of the impedances $Z_S$ of the fuel cell stack 10 individually measured by applying AC signals having different frequencies to the fuel cell stack 10 in a state in which a mixture gas of 80% of air in the atmosphere and 15% of nitrogen is supplied to the cathode 18. Each of the AC signals may have any one of frequencies of 30 Hz, 50 Hz, 70 Hz, 100 Hz, and 150 Hz. In the plots illustrated in FIG. 6, a horizontal axis indicates a current density of the AC signal applied to the fuel cell stack 10, and a vertical axis indicates the impedance $Z_S$ of the fuel cell stack 10.

Since the mixture gas is a mixture gas of 85% of air in the atmosphere and 15% of nitrogen, a concentration of oxygen in the mixture gas is lower than that of oxygen in the air in the atmosphere. Therefore, the cathode impedance $Z_C$ in the case in which the mixture gas is supplied to the cathode 18 is higher than that in the case in which the air in the atmosphere is supplied to the cathode 18. However, as illustrated in FIG. 6, as the frequency of the AC signal becomes high, a difference between the impedance $Z_S$ of the fuel cell stack 10 measured in a state in which only the air is supplied to the cathode 18 and the impedance $Z_S$ of the fuel cell stack 10 measured in a state in which the mixture gas is supplied to the cathode 18 becomes significantly small. According to such a measurement result, it may be appreciated that a ratio of the cathode impedance $Z_C$ to the impedance $Z_S$ of the fuel cell stack 10 becomes significantly low as the frequency of the AC signal becomes high. In addition, according to such a measurement result, it may be appreciated that a ratio of the cathode impedance $Z_C$ to the impedance $Z_S$ of the fuel cell stack 10 is high in a right curved line section $I_{CR}$ in which the frequency of the AC signal is relatively low in the equivalent circuit impedance curve $I_C$ illustrated in FIG. 4 and a ratio of the anode impedance $Z_A$ to the impedance $Z_S$ of the fuel cell stack 10 is high in a left curved line section $I_{CL}$ in which the frequency of the AC signal is relatively high in the equivalent circuit impedance curve $I_C$ illustrated in FIG. 4. Therefore, when the frequency of the AC signal becomes high to be a predetermined value or more, the cathode impedance $Z_C$ becomes low so as to approach 0 mΩ·cm², and the electrolyte membrane impedance $Z_M$ and the anode impedance $Z_A$ occupy most of the impedance $Z_S$ of the fuel cell stack 10.

The second frequency $\omega_2$ may be determined so that a ratio of the cathode impedance $Z_C$ to the second impedance $Z_{S2}$ of the fuel cell stack 10 is less than a predetermined reference ratio, using such a principle. It is preferable a minimum value of frequencies at which the cathode impedance $Z_C$ substantially becomes 0 mΩ·cm² is set to the second frequency $\omega_2$ in consideration of this point. For example, the second frequency $\omega_2$ may be 200 Hz. When the second frequency $\omega_2$ is determined as described above, the impedance value calculated by subtracting the electrolyte membrane impedance HFR derived in the step S12 from the second impedance $Z_{S2}$ of the fuel cell stack 10 may become substantially equal to the anode impedance $Z_A$, as represented by Equations 6 and 7.

$$Z_{S2}(\omega_2)=Z_M(\omega_2)+Z_A(\omega_2)+Z_C(\omega_2) \quad \text{[Equation 6]}$$

$$Z_A(\omega_2) \approx Z_S(\omega_2)-HFR \quad \text{[Equation 7]}$$

The second frequency $\omega_2$ may be pre-stored in the storage of the controller 80. Therefore, at the time of performing the step S14, the controller 80 controls the impedance measurer 190 so that the second AC signal having the second frequency $\omega_2$ is applied to the fuel cell stack 10. In this case, the impedance measurer 190 may derive the second impedance $Z_{S2}$ of the fuel cell stack 10 from the second output voltage and the second output current of the fuel cell stack 10 each detected by the voltmeter 170 and the ammeter 180, and then set the impedance value calculated by subtracting the electrolyte membrane impedance HFR derived in the step S12 from the second impedance $Z_{S2}$ of the fuel cell stack 10 to the anode impedance $Z_A$. Hereinafter, the anode impedance $Z_A$ derived in the step S14 as described above will be called an 'MFR'.

The step S16 may be performed by measuring a third output voltage and a third output current of the fuel cell stack 10 in a state in which the third AC signal having the third frequency $\omega_3$ lower than the second frequency $\omega_2$ is applied to the fuel cell stack 10 and setting an impedance value calculated by subtracting the electrolyte membrane impedance HFR derived in the step S12 and the anode impedance MFR derived in the step S14 from a third impedance $Z_{S3}$ of the fuel cell stack 10 derived from the third output voltage and the third output current of the fuel cell stack 10 to the cathode impedance $Z_C$.

The third frequency $\omega_3$ may be determined so that a ratio of the cathode impedance $Z_C$ to the third impedance $Z_{S3}$ of the fuel cell stack 10 is a predetermined reference ratio or more. It is preferable a frequency at which the ratio of the cathode impedance $Z_C$ to the third impedance $Z_{S3}$ of the fuel cell stack 10 becomes a maximum value is set to the third frequency $\omega_3$ in consideration of this point. When the third frequency $\omega_3$ is determined as described above, the impedance value calculated by subtracting the electrolyte membrane impedance HFR derived in the step S12 and the anode impedance MFR derived in the step S14 from the third impedance $Z_{S3}$ of the fuel cell stack 10 may become substantially equal to the cathode impedance $Z_C$, as represented by Equations 8 and 9.

$$Z_S(\omega_3)=Z_M(\omega_3)+Z_A(\omega_3)+Z_C(\omega_3) \quad \text{[Equation 8]}$$

$$Z_C(\omega_3)\approx Z_S(\omega_3)-HFR-MFR \quad \text{[Equation 9]}$$

The third frequency $\omega_3$ may be pre-stored in the storage of the controller 80. Therefore, at the time of performing the step S16, the controller 80 controls the impedance measurer 190 so that the third AC signal having the third frequency $\omega_3$ is applied to the fuel cell stack 10. In this case, the impedance measurer 190 may derive the third impedance $Z_{S3}$ of the fuel cell stack 10 from the third output voltage and the third output current of the fuel cell stack 10 each detected by the voltmeter 170 and the ammeter 180, and then set the impedance value calculated by subtracting the electrolyte membrane impedance HFR derived in the step S12 and the anode impedance MFR derived in the step S14 from the third impedance $Z_{S3}$ of the fuel cell stack 10 to the cathode impedance $Z_C$. Hereinafter, the cathode impedance $Z_C$ derived in the step S16 as described above will be called an 'LFR'.

Figure 7:
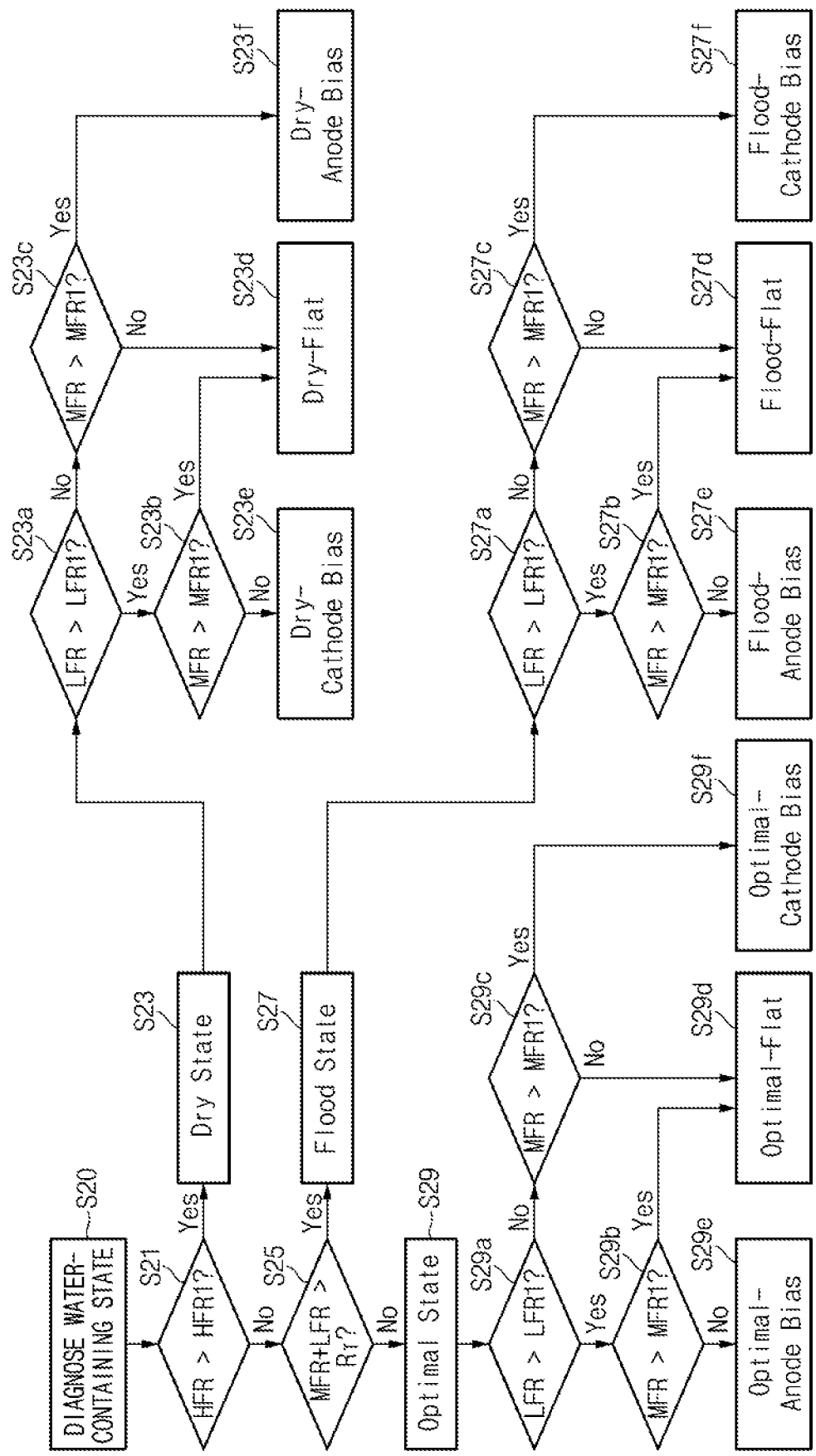
FIG. 7 is a flow chart for describing a method for diagnosing a water-containing state of a fuel cell stack.
Figure 8:
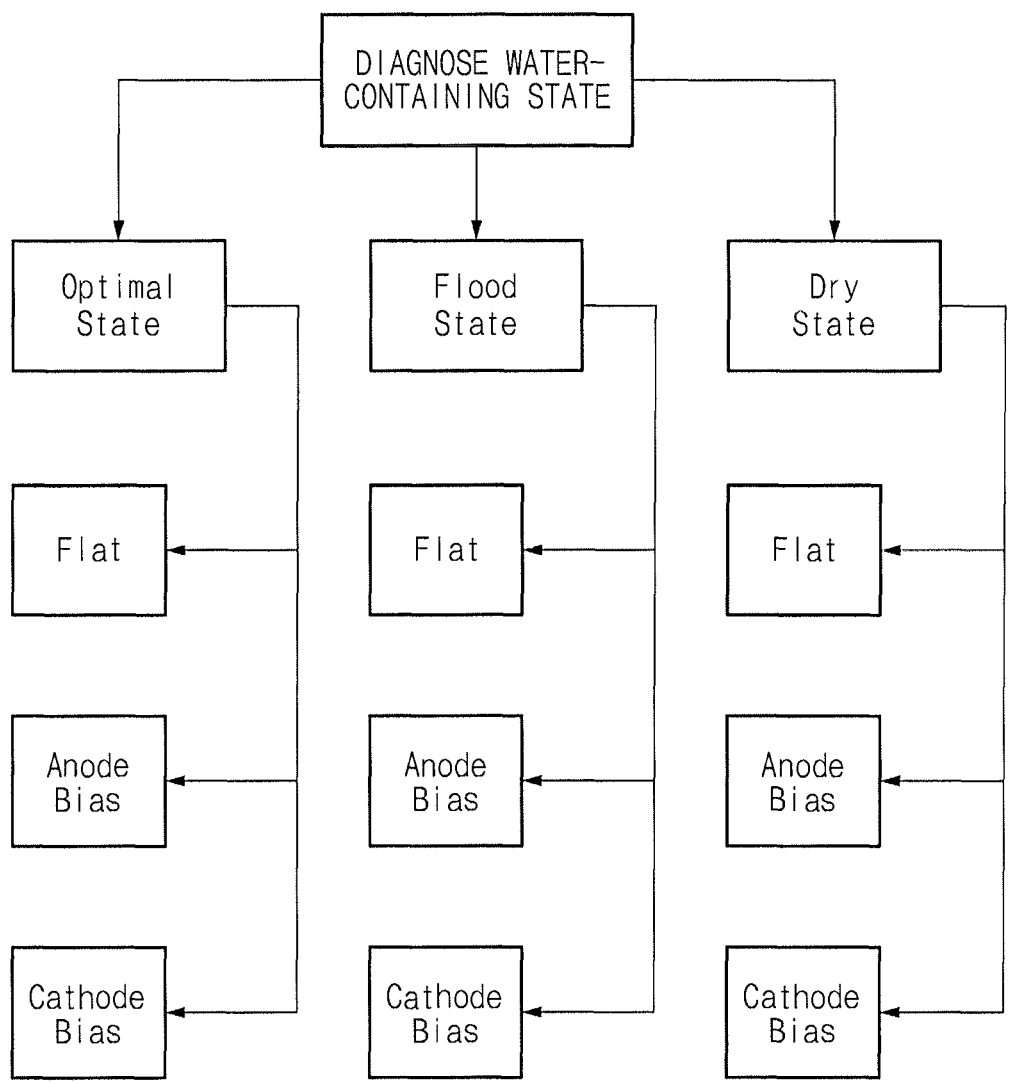
FIG. 8 is a classification view classifying water-containing states of a fuel cell stack for each type.

FIG. 7 is a flow chart for describing a method for diagnosing a water-containing state of a fuel cell stack, and FIG. 8 is a classification view classifying water-containing states of a fuel cell stack for each type.

Then, as illustrated in FIG. 7, the step S20 may include a step (S21) of deciding whether or not the electrolyte membrane impedance HFR exceeds a predetermined reference electrolyte membrane impedance HFR1, a step (S23) of deciding that the fuel cell stack 10 is in a dry state in the case in which the electrolyte membrane impedance HFR exceeds the reference electrolyte membrane impedance HFR1, a step (S25) of deciding whether or not a summed impedance MRF+LFR calculated by summing the anode impedance MRF and the cathode impedance LFR exceeds a predetermined reference summed impedance $R_T$ in the case in which the electrolyte membrane impedance HFR is the reference electrolyte membrane impedance HFR1 or less, a step (S27) of deciding that the fuel cell stack 10 is in a flood state in the case in which the summed impedance MRF+LFR exceeds the reference summed impedance $R_T$, a step of (S29) deciding that the fuel cell stack 10 is in an optimal state in the case in which the summed impedance MRF+LFR is the reference summed impedance $R_T$ or less, and the like.

In FIG. 8, water-containing states of the fuel cell stack 10 are classified for each type. Hereinafter, a method for classifying water-containing states of the fuel cell stack 10 for each type through an analysis of the electrolyte membrane impedance HFR, the anode impedance MFR, and the cathode impedance LFR will be described.

The step S21 may be performed by comparing the electrolyte membrane impedance HFR and the reference electrolyte membrane impedance HFR1 with each other through the controller 80. The reference electrolyte membrane impedance HFR1 is preferably pre-stored in the storage of the controller 80, but is not limited thereto. The reference electrolyte membrane impedance HFR1 is not particularly limited. For example, the reference electrolyte membrane impedance HFR1 may be 70 $m\Omega \cdot cm^2$.

Figure 9A:
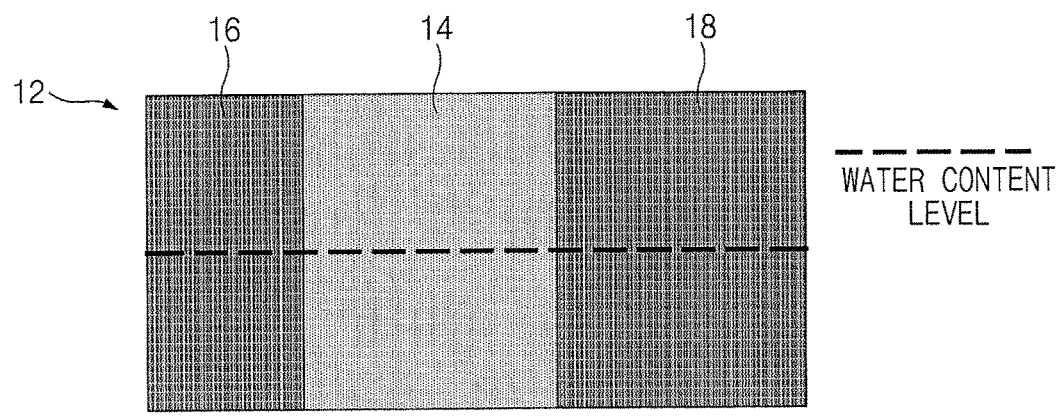
FIGS. 9A to 9C are conceptual diagrams illustrating aspects in which water is distributed in each portion of a fuel cell stack in the case in which the fuel cell stack is in a dry state.
Figure 9B:
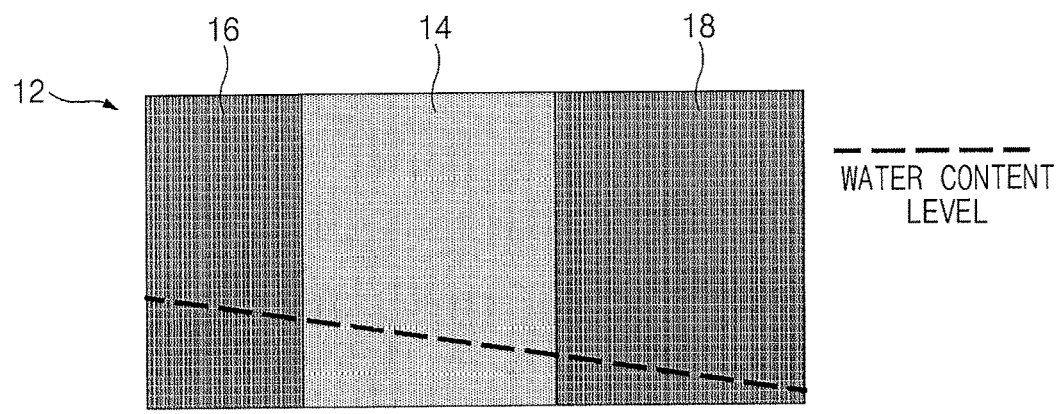
Figure 9C:
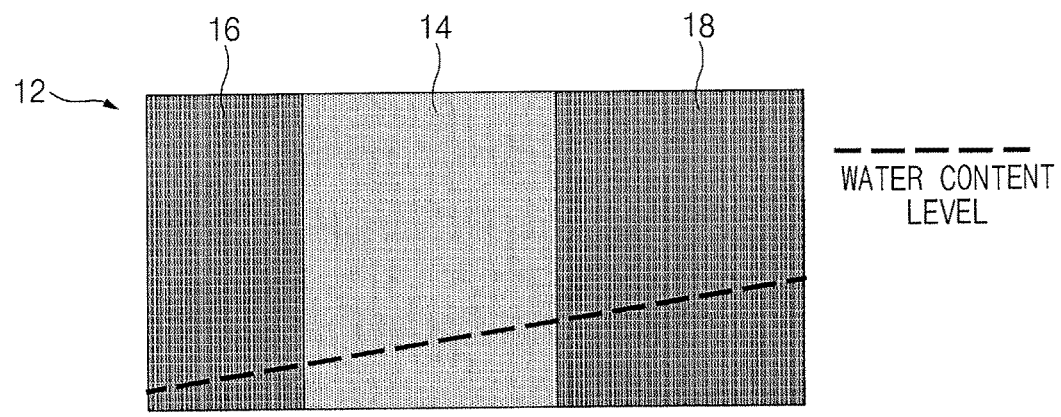

FIGS. 9A to 9C are conceptual diagrams illustrating aspects in which water is distributed in each portion of a fuel cell stack in the case in which the fuel cell stack is in a dry state.

The step S23 may be performed by diagnosing that the fuel cell stack 10 is in the dry state through the controller 80 in the case in which it is decided in the step S21 that the electrolyte membrane impedance HFR exceeds the reference electrolyte membrane impedance HFR1. The dry state of the fuel cell stack 10 indicates a state in which a water content of the fuel cell stack 10 is less than an appropriate level.

In addition, in the step S23, it may be additionally decided whether or not the cathode impedance LFR exceeds a predetermined reference cathode impedance LFR1 and whether or not the anode impedance MFR exceeds a predetermined reference anode impedance MFR1, in order to individually diagnose water-containing states of each of the electrolyte membrane 14, the anode 16, and the cathode 18.

For example, as illustrated in FIG. 7, the step S23 may include a step (S23a) of deciding whether or not the cathode impedance LFR exceeds the reference cathode impedance LFR1, a step (S23b) of deciding whether or not the anode impedance MFR exceeds the reference anode impedance MFR1 in the case in which the cathode impedance LFR exceeds the reference cathode impedance LFR1, a step (S23c) of deciding whether or not the anode impedance MFR exceeds the reference anode impedance MFR1 in the case in which cathode impedance LFR is the reference cathode impedance LFR1 or less, and the like.

The step S23a may be performed by comparing the cathode impedance LFR and the reference cathode impedance LFR1 with each other through the controller 80. The reference cathode impedance LFR1 is preferably pre-stored in the storage of the controller 80, but is not limited thereto. The reference cathode impedance LFR1 is not particularly limited. For example, the reference cathode impedance LFR1 may be 90 $m\Omega \cdot cm^2$.

The step S23b may be performed by comparing the anode impedance MFR and the reference anode impedance MFR1 with each other through the controller 80 in the case in which it is decided in S23a that the cathode impedance LFR exceeds the reference cathode impedance LFR1. The reference anode impedance MFR1 is preferably pre-stored in the storage of the controller 80, but is not limited thereto. The reference anode impedance MFR1 is not particularly limited. For example, the reference anode impedance MFR1 may be 30 mΩ·cm².

Referring to FIG. 8, the controller 80 may diagnose a detailed type of the dry state of the fuel cell stack 10 described above that the anode 16 and the cathode 18 are in a dry-flat state (S23d) in the case in which it is decided in the step S23b that the anode impedance MFR exceeds the reference anode impedance MFR1. Referring to FIG. 9A, the dry-flat state of the anode 16 and the cathode 18 indicates that the anode 16 and the cathode 18 are in a state in which they are equally dried so that water content levels of the anode 16 and the cathode 18 are equal to each other.

Referring to FIG. 8, the controller 80 may diagnose a detailed type of the dry state of the fuel cell stack 10 described above that the cathode 18 is in a dry-cathode bias state (S23e) in the case in which it is decided in the step S23b that the anode impedance MFR is the reference anode impedance MFR1 or less. Referring to FIG. 9B, the dry-cathode bias state of the cathode 18 indicates that the cathode 18 is in a state in which it is further dried as compared with the node 16 so that a water content level of the cathode 18 is lower than that of the node 16.

The step S23c may be performed by comparing the anode impedance MFR and the reference anode impedance MFR1 with each other through the controller 80 in the case in which it is decided that the cathode impedance LFR is the reference cathode impedance LFR1 or less. Here, the reference anode impedance MFR1 in the step S23c is preferably the same as the reference anode impedance MFR1 in S23b, but is not limited thereto.

Referring to FIG. 8, the controller 80 may diagnose a detailed type of the dry state of the fuel cell stack 10 described above that the node 16 is in a dry-anode bias state (S23f) in the case in which it is decided in the step S23c that the anode impedance MFR exceeds the reference anode impedance MFR1. Referring to FIG. 9C, the dry-anode bias state of the node 16 indicates that the cathode 18 is in a state in which it is further dried as compared with the cathode 18 so that a water content level of the anode 16 is lower than that of the cathode 18.

Referring to FIG. 8, the controller 80 may diagnose a detailed type of the dry state of the fuel cell stack 10 described above that the anode 16 and the cathode 18 are in a dry-flat state in the case in which it is decided in the step S23c that the anode impedance MFR is the reference anode impedance MFR1 or less.

The step S25 may be performed by comparing the summed impedance MFR+LFR of the anode impedance MFR and the cathode impedance LFR and the reference summed impedance $R_T$ with each other through the controller 80. The reference summed impedance $R_T$ is preferably pre-stored in the storage of the controller 80, but is not limited thereto. The reference summed impedance $R_T$ is not particularly limited. For example, the reference summed impedance $R_T$ may be 120 mΩ·cm².

Figure 10A:
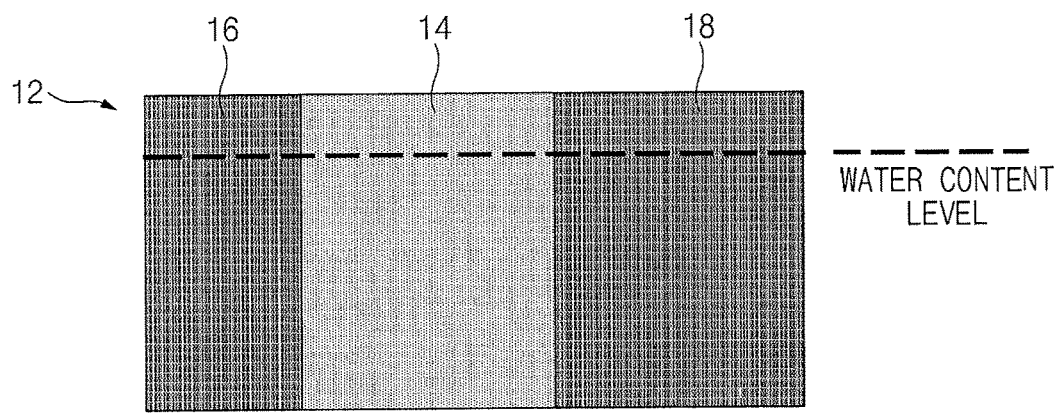
FIGS. 10A to 10C are conceptual diagrams illustrating aspects in which water is distributed in each portion of a fuel cell stack in the case in which the fuel cell stack is in a flood state.
Figure 10B:
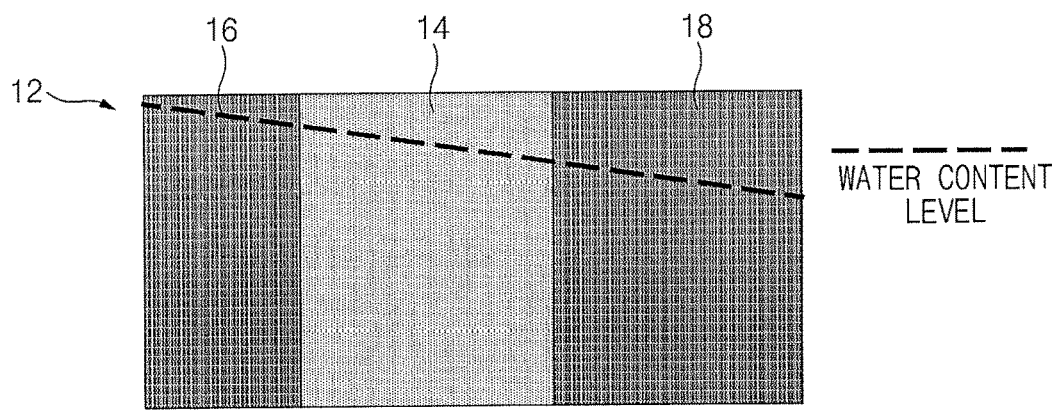
Figure 10C:
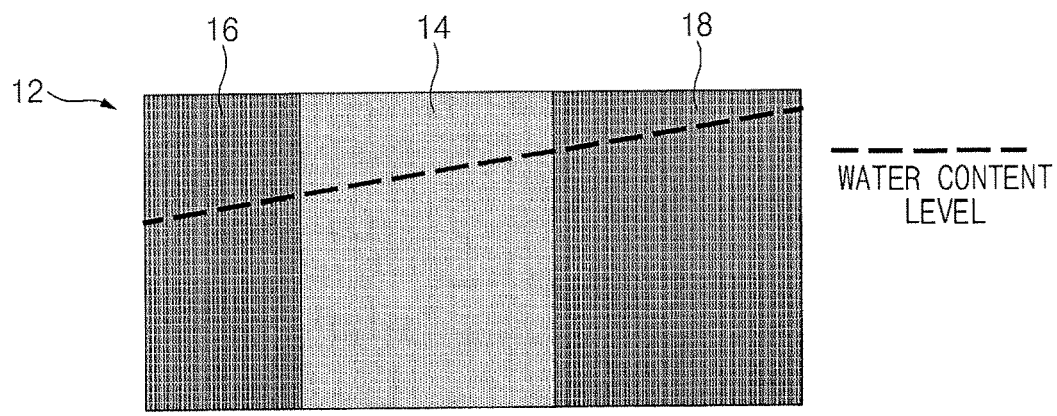

FIGS. 10A to 10C are conceptual diagrams illustrating aspects in which water is distributed in each portion of a fuel cell stack 10 in the case in which the fuel cell stack 10 is in a flood state.

The step S27 may be performed by diagnosing that the fuel cell stack 10 is in the flood state through the controller 80 in the case in which it is decided in the step S25 that the summed impedance MFR+LFR exceeds the reference summed impedance $R_T$. The flood state of the fuel cell stack 10 indicates a state in which a water content of the fuel cell stack 10 is more than an appropriate level.

In addition, in the step S27, it may be additionally decided whether or not the cathode impedance LFR exceeds a predetermined reference cathode impedance LFR1 and whether or not the anode impedance MFR exceeds a predetermined reference anode impedance MFR1, in order to individually diagnose water-containing states of each of the electrolyte membrane 14, the anode 16, and the cathode 18.

For example, as illustrated in FIG. 7, the step S27 may include a step (S27a) of deciding whether or not the cathode impedance LFR exceeds the reference cathode impedance LFR1, a step (S27b) of deciding whether or not the anode impedance MFR exceeds the reference anode impedance MFR1 in the case in which the cathode impedance LFR exceeds the reference cathode impedance LFR1, a step (S27c) of deciding whether or not the anode impedance MFR exceeds the reference anode impedance MFR1 in the case in which cathode impedance LFR is the reference cathode impedance LFR1 or less, and the like.

The step S27a may be performed by comparing the cathode impedance LFR and the reference cathode impedance LFR1 with each other through the controller 80. The reference cathode impedance LFR1 is preferably pre-stored in the storage of the controller 80, but is not limited thereto. The reference cathode impedance LFR1 is not particularly limited. For example, the reference cathode impedance LFR1 may be 90 mΩ·cm².

The step S27b may be performed by comparing the anode impedance MFR and the reference anode impedance MFR1 with each other through the controller 80 in the case in which it is decided in the step S27a that the cathode impedance LFR exceeds the reference cathode impedance LFR1. The reference anode impedance MFR1 is preferably pre-stored in the storage of the controller 80, but is not limited thereto. The reference anode impedance MFR1 is not particularly limited. For example, the reference anode impedance MFR1 may be 30 mΩ·cm².

Referring to FIG. 8, the controller 80 may diagnose a detailed type of the flood state of the fuel cell stack 10 described above that the anode 16 and the cathode 18 are in a flood-flat state in the case in which it is decided in the step S27b that the anode impedance MFR exceeds the reference anode impedance MFR1. Referring to FIG. 10A, the flood-flat state of the anode 16 and the cathode 18 indicates that the anode 16 and the cathode 18 are in a state in which they are equally flooded so that water content levels of the anode 16 and the cathode 18 are equal to each other.

Referring to FIG. 8, the controller 80 may diagnose a detailed type of the flood state of the fuel cell stack 10 described above that the anode 16 is in a flood-anode bias state (S27d) in the case in which it is decided in the step S27b that the anode impedance MFR is the reference anode impedance MFR1 or less. Referring to FIG. 10B, the flood-anode bias state of the anode 16 indicates that the anode 16 is in a state in which it is further flooded as compared with the cathode 18 so that a water content level of the anode 16 is higher than that of the cathode 18.

The step S27c may be performed by comparing the anode impedance MFR and the reference anode impedance MFR1 with each other through the controller 80 in the case in which it is decided in the step S27a that the cathode impedance LFR is the reference cathode impedance LFR1 or less. Here, the reference anode impedance MFR1 in the step S27c is preferably the same as the reference anode impedance MFR1 in the step S27b, but is not limited thereto.

Referring to FIG. 8, the controller 80 may diagnose a detailed type of the flood state of the fuel cell stack 10 described above that the cathode 18 is in a flood-cathode bias state (S27f) in the case in which it is decided in the step S27c that the anode impedance MFR exceeds the reference anode impedance MFR1. Referring to FIG. 10C, the flood-cathode bias state of the cathode 18 indicates that the cathode 18 is in a state in which it is further flooded as compared with the anode 16 so that a water content level of the cathode 18 is higher than that of the anode 16.

Referring to FIG. 8, the controller 80 may diagnose a detailed type of the flood state of the fuel cell stack 10 described above that the anode 16 and the cathode 18 are in a flood-flat state (S27d) in the case in which it is decided in the step S27c that the anode impedance MFR is the reference anode impedance MFR1 or less.

Figure 11A:
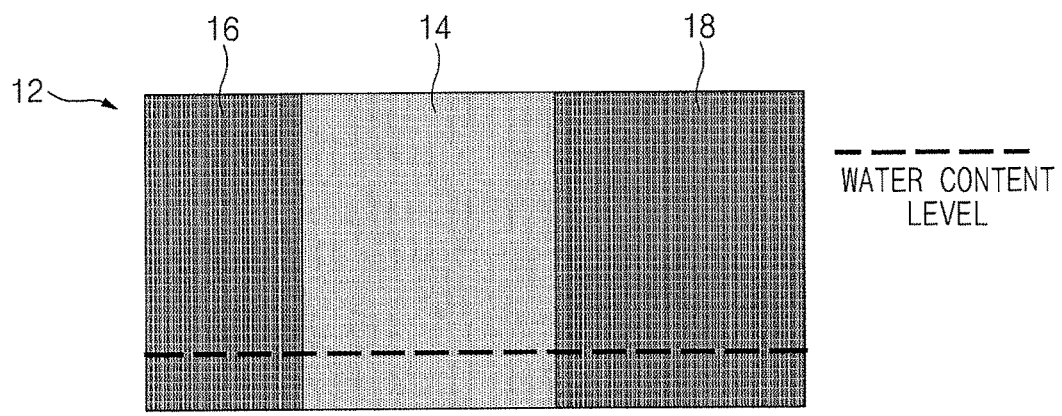
FIGS. 11A to 11C are conceptual diagrams illustrating aspects in which water is distributed in each portion of a fuel cell stack in the case in which the fuel cell stack is in an optimal state.
Figure 11B:
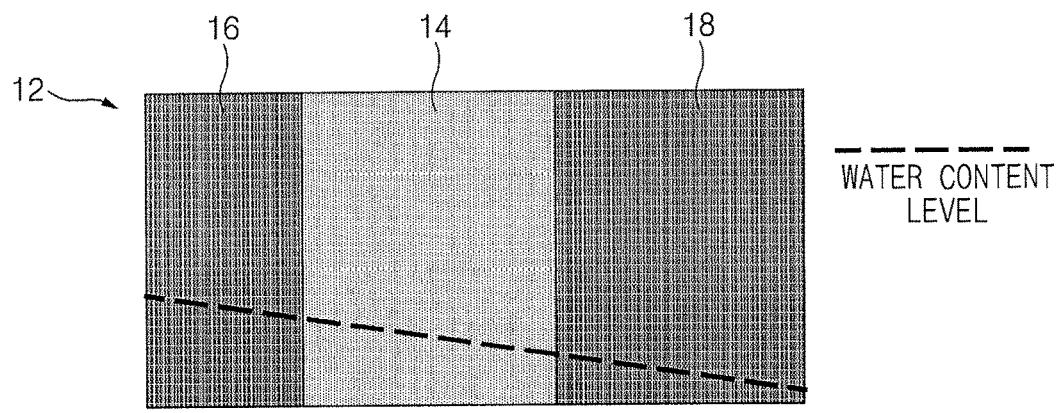
Figure 11C:
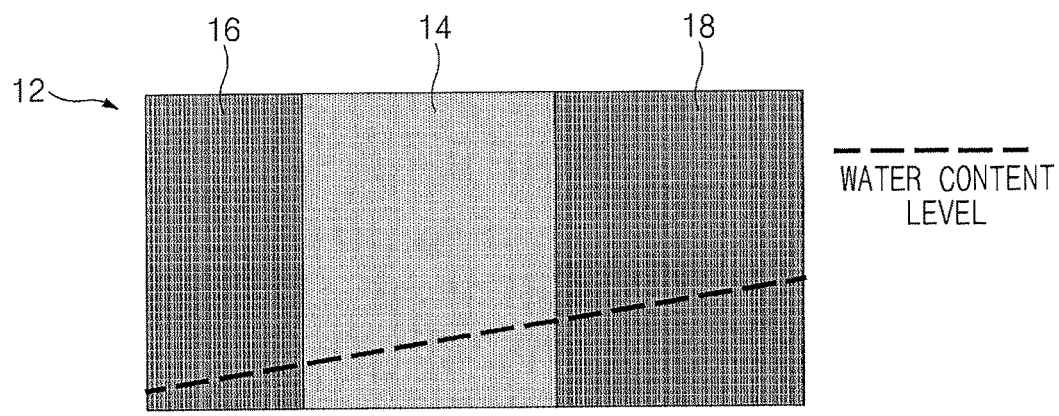

FIGS. 11A to 11C are conceptual diagrams illustrating aspects in which water is distributed in each portion of a fuel cell stack in the case in which the fuel cell stack is in an optimal state.

The step S29 may be performed by diagnosing that the fuel cell stack 10 is in the optimal state through the controller 80 in the case in which it is decided in the step S25 that the summed impedance MFR+LFR is the reference summed impedance $R_T$ or less. The optimal state of the fuel cell stack 10 indicates a state in which a water content of the fuel cell stack 10 is an appropriate level.

In addition, in the step S29, it may be additionally decided whether or not the cathode impedance LFR exceeds a predetermined reference cathode impedance LFR1 and whether or not the anode impedance MFR exceeds a predetermined reference anode impedance MFR1, in order to individually diagnose water-containing states of each of the electrolyte membrane 14, the anode 16, and the cathode 18.

For example, as illustrated in FIG. 7, the step S29 may include a step (S29a) of deciding whether or not the cathode impedance LFR exceeds the reference cathode impedance LFR1, a step (S29b) of deciding whether or not the anode impedance MFR exceeds the reference anode impedance MFR1 in the case in which the cathode impedance LFR exceeds the reference cathode impedance LFR1, a step (S29c) of deciding whether or not the anode impedance MFR exceeds the reference anode impedance MFR1 in the case in which cathode impedance LFR is the reference cathode impedance LFR1 or less, and the like.

The step S29a may be performed by comparing the cathode impedance LFR and the reference cathode impedance LFR1 with each other through the controller 80. The reference cathode impedance LFR1 is preferably pre-stored in the storage of the controller 80, but is not limited thereto. The reference cathode impedance LFR1 is not particularly limited. For example, the reference cathode impedance LFR1 may be 90 mΩ·cm².

The step S29b may be performed by comparing the anode impedance MFR and the reference anode impedance MFR1 with each other through the controller 80 in the case in which it is decided in the step S29a that the cathode impedance LFR exceeds the reference cathode impedance LFR1. The reference anode impedance MFR1 is preferably pre-stored in the storage of the controller 80, but is not limited thereto. The reference anode impedance MFR1 is not particularly limited. For example, the reference anode impedance MFR1 may be 30 mΩ·cm².

Referring to FIG. 8, the controller 80 may diagnose a detailed type of the optimal state of the fuel cell stack 10 described above that the anode 16 and the cathode 18 are in an optimal-flat state in the case in which it is decided in the step S29b that the anode impedance MFR exceeds the reference anode impedance MFR1. Referring to FIG. 11A, the optimal-flat state of the anode 16 and the cathode 18 indicates that water contents of the anode 16 and the cathode 18 are in a state in which they are an appropriate level so that water content levels of the anode 16 and the cathode 18 are equal to each other.

Referring to FIG. 8, the controller 80 may diagnose a detailed type of the optimal state of the fuel cell stack 10 described above that the anode 16 is in an optimal-anode bias state in the case in which it is decided in the step S29b that the anode impedance MFR is the reference anode impedance MFR1 or less. Referring to FIG. 11B, the optimal-anode bias state of the anode 16 indicates that the anode 16 is in a state in which it is further flooded as compared with the cathode 18 so that a water content level of the anode 16 is higher than that of the cathode 18.

The step S29c may be performed by comparing the anode impedance MFR and the reference anode impedance MFR1 with each other through the controller 80 in the case in which it is decided in the step S29a that the cathode impedance LFR is the reference cathode impedance LFR1 or less. Here, the reference anode impedance MFR1 in the step S29c is preferably the same as the reference anode impedance MFR1 in the step S29b, but is not limited thereto.

Referring to FIG. 8, the controller 80 may diagnose a detailed type of the optimal state of the fuel cell stack 10 described above that the cathode 18 is in an optimal-cathode bias state in the case in which it is decided in the step S29c that the anode impedance MFR exceeds the reference anode impedance MFR1. Referring to FIG. 11C, the optimal-cathode bias state of the cathode 18 indicates that the cathode 18 is in a state in which it is further flooded as compared with the anode 16 so that a water content level of the cathode 18 is higher than that of the anode 16.

Referring to FIG. 8, the controller 80 may diagnose a detailed type of the optimal state of the fuel cell stack 10 described above that the anode 16 and the cathode 18 are in an optimal-flat state in the case in which it is decided in the step S29c that the anode impedance MFR is the reference anode impedance MFR1 or less.

The step S30 may be performed by comparing the water-containing state of the fuel cell stack 10 diagnosed in the step S20 and the target state of the fuel cell stack 10 with each other through the controller 80.

The target state of the fuel cell stack 10 is not particularly limited, but may be a water-containing state of the fuel cell stack 10 appropriate for a current driving aspect of the fuel cell system 1.

For example, in the case in which the fuel cell system 1 is being driven, the target state of the fuel cell stack 10 may be determined so that a water-content of the fuel cell stack 10 may be controlled to be a level appropriate for driving the fuel cell system 1. In this case, occurrence of an abnormal phenomenon due to the dry state or the flood state of the fuel cell stack, such as limitation of movement of a reaction gas, an increase in reaction loss of hydrogen and oxygen, damage to the electrolyte membrane 14, or the like, may be prevented to improve performance and durability of the fuel cell stack 10.

For example, in the case in which the driving of the fuel cell system 1 is being ended, the target state of the fuel cell stack 10 may be determined so as to make the fuel cell stack 10 dry by reducing a water-content of the fuel cell stack 10. In this case, deterioration of cold start performance of the fuel cell system 1 due to water contained in the fuel cell stack 10 at the time of cold start of the fuel cell system 1 may be prevented.

The target state of the fuel cell stack 10 described above is preferably pre-stored in the storage of the controller 80, but is not limited thereto.

The controller 80 may compare the target state of the fuel cell stack 10 determined as described above and the water-containing state of the fuel cell stack 10 diagnosed in the step S20 with each other. As illustrated in FIG. 5, when the target state of the fuel cell stack 10 and the water-containing state of the fuel cell stack 10 diagnosed in the step S20 are the same as each other, the step S10 described above may be again performed, and when the target state of the fuel cell stack 10 and the water-containing state of the fuel cell stack 10 diagnosed in the step S20 are different from each other, a step S40 to be described below may be performed.

The step S40 may be performed by controlling the fuel cell system 1 through the controller 80 so that the fuel cell stack 10 is controlled to be the target state. For convenience of explanation, hereinafter, a method for controlling the fuel cell stack 10 to be the target state in an example of a case in which the optimal state described above is determined to be the target state of the fuel cell stack 10 will be described.

In the case in which the fuel cell stack 10 is in the dry state and the anode 16 is in the dry-anode bias state, an abnormal phenomenon such as an increase in loss of the output voltage of the fuel cell stack 10, damage to catalyst layers of the unit cells 12 due to a radical generation reaction, or the like, may occur. In this case, it is likely that the dry state of the fuel cell stack 10 will be caused by the dry-anode bias state of the anode 16. Therefore, in the case in which it is diagnosed that the fuel cell stack 10 is in the dry state and the anode 16 is in the dry-anode bias state, the controller 80 may control the fuel cell stack 10 to be in the optimal state by a method for controlling an aspect in which hydrogen is supplied to the anode 16 to solve the dry-anode bias state of the anode 16. For example, the controller 80 may control driving of the hydrogen supplying device 20, the hydrogen supplying valve 30, and the purge valve 60, and the like, to decrease a flow rate of hydrogen supplied to the anode 16, increase a pressure of the anode 16, or increase a water content of the anode 16.

In the case in which the fuel cell stack 10 is in the dry state and the cathode 18 is in the dry-cathode bias state, an abnormal phenomenon such as an increase in loss of the output voltage of the fuel cell stack 10, damage to catalyst layers due to a radical generation reaction, or the like, may occur. In this case, it is likely that the dry state of the fuel cell stack 10 will be caused by the thy-cathode bias state of the anode 18. Therefore, in the case in which it is diagnosed that the fuel cell stack 10 is in the dry state and the cathode 18 is in the dry-cathode bias state, the controller 80 may control the fuel cell stack 10 to be in the optimal state by a method for controlling an aspect in which the air is supplied to the cathode 18 to solve the dry-cathode bias state of the cathode 18. For example, the controller 80 may control driving of the air supplying device 40, the air supplying valve 50, and the air discharging valve 70, and the like, to decrease a flow rate of air supplied to the cathode 18, increase a pressure of the cathode 18, or increase a water content of the cathode 18.

In the case in which the fuel cell stack 10 is in the flood state and the anode 16 is in the flood-anode bias state, an abnormal phenomenon such as an increase in loss of the output voltage of the fuel cell stack 10, damage to catalyst layers of the unit cells 12 due to a carbon corrosion reaction, or the like, may occur. In this case, it is likely that the flood state of the fuel cell stack 10 will be caused by the flood-anode bias state of the anode 16. Therefore, in the case in which it is diagnosed that the fuel cell stack 10 is in the flood state and the anode 16 is in the flood-anode bias state, the controller 80 may control the fuel cell stack 10 to be in the optimal state by a method for controlling an aspect in which hydrogen is supplied to the anode 16 to solve the flood-anode bias state of the anode 16. For example, the controller 80 may control driving of the hydrogen supplying device 20, the hydrogen supplying valve 30, and the purge valve 60, and the like, to increase a flow rate of hydrogen supplied to the anode 16, decrease a pressure of the anode 16, perform purge on the anode 16, or decrease a water content of the anode 16.

In the case in which the fuel cell stack 10 is in the flood state and the cathode 18 is in the flood-cathode bias state, an abnormal phenomenon such as an increase in loss of the output voltage of the fuel cell stack 10, damage to catalyst layers of the unit cells 12 due to a carbon corrosion reaction, or the like, may occur. In this case, it is likely that the flood state of the fuel cell stack 10 will be caused by the flood-cathode bias state of the cathode 18. Therefore, in the case in which it is diagnosed that the fuel cell stack 10 is in the flood state and the cathode 18 is in the flood-cathode bias state, the controller 80 may control the fuel cell stack 10 to be in the optimal state by a method for controlling an aspect in which the air is supplied to the cathode 18 to solve the flood-cathode bias state of the cathode 18. For example, the controller 80 may control driving of the air supplying device 40, the air supplying valve 50, and the air discharging valve 70, and the like, to increase a flow rate of air supplied to the cathode 18, decrease a pressure of the cathode 18, or decrease a water content of the cathode 18.

Meanwhile, as described above, the anode impedance MFR may be calculated by applying the second AC signal having the second frequency $\omega_2$ at which the cathode impedance $Z_C$ substantially becomes 0 m$\Omega$·cm$^2$ to the fuel cell stack 10 in the step S14. However, generally, a durability state of the cathode 18 is gradually changed due to deterioration of the cathode 18 as a period in which the fuel cell stack 10 is used elapses. Therefore, a frequency at which the cathode impedance $Z_C$ substantially becomes 0 m$\Omega$·cm$^2$ is gradually increased as the period in which the fuel cell stack 10 is used elapses. Therefore, in the case in which the water-containing state of the fuel cell stack 10 is again diagnosed after a long time elapses from a point in time in which the water-containing state of the fuel cell stack 10 is previously diagnosed, when the second frequency $\omega_2$ that is previously used is used as it is to measure the anode impedance MFR, there is a risk that an error will be generated in a measuring result of the anode impedance MFR.

In order to solve this problem, the method for diagnosing a water-containing state of a fuel cell stack 10 according to an exemplary embodiment of the present disclosure may further include a step (S50) of controlling the second frequency $\omega_2$ so that the ratio of the cathode impedance $Z_C$ to the second impedance $Z_{S2}$ of the fuel cell stack 10 derived in the step S14 is less than a predetermined reference ratio. The step S50 is preferably performed before the step S14, but is not limited thereto.

Figure 12:
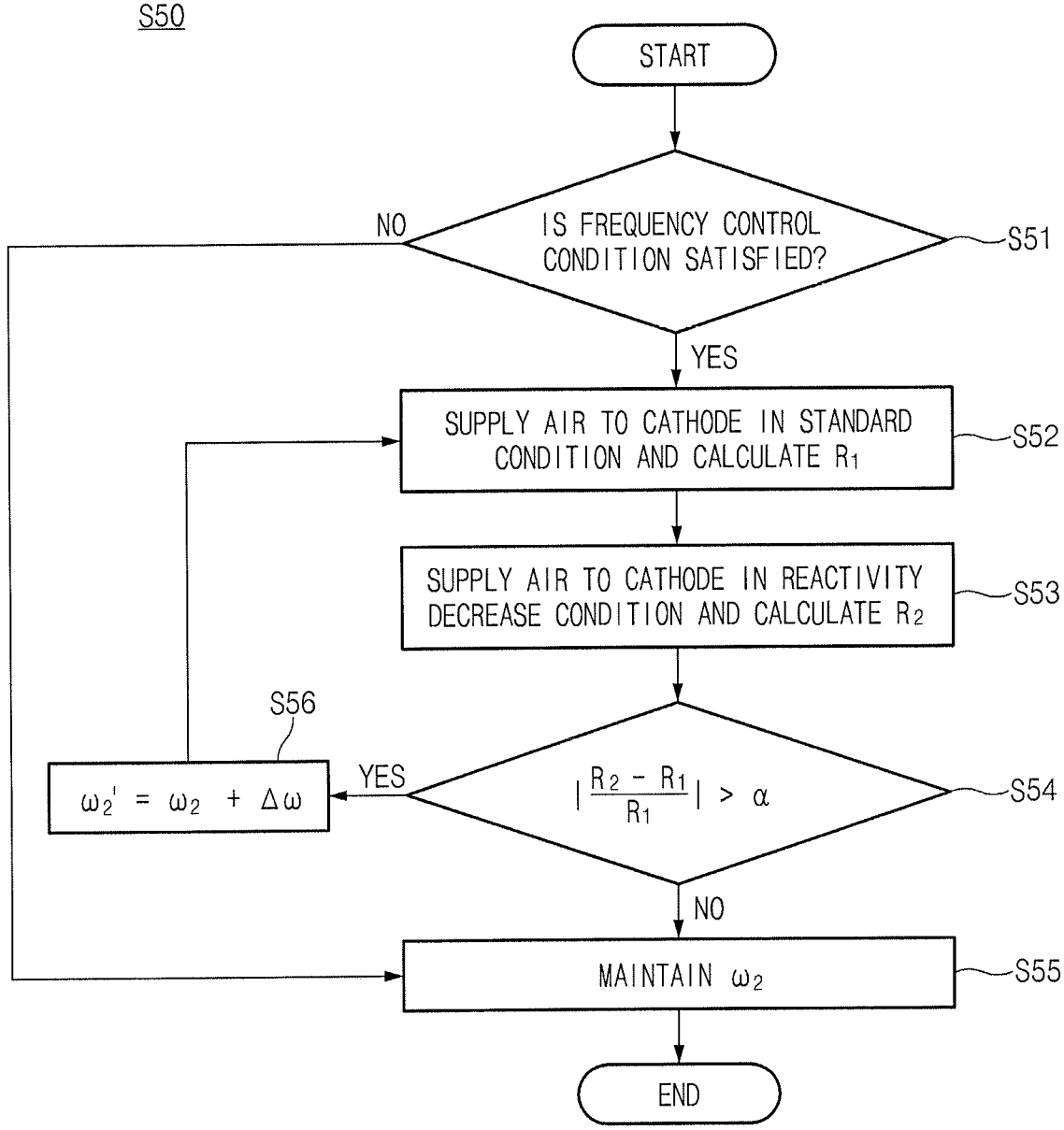
FIG. 12 is a flow chart for describing a method for setting a second frequency of a second AC signal.

In the step S50, a method for controlling the second frequency $\omega_2$ is not particularly limited. As illustrated in FIG. 12, for example, the step S50 may include a step (S51) of deciding whether or not a predetermined frequency control condition is satisfied, a step (S52) of supplying the air to the cathode 18 by a predetermined standard flow rate or controlling a pressure of the cathode 18 to be a predetermined standard pressure and at the same time, applying the second AC signal having the second frequency $\omega_2$ to the fuel cell stack 10 to derive an anode impedance $R_1$ in the case in which the frequency control condition is satisfied, a step (S53) of supplying the air to the cathode 18 by a flow rate less than the standard flow rate or controlling a pressure of the cathode 18 to be a pressure lower than the standard pressure and at the same time, applying the second AC signal having the second frequency $\omega_2$ to the fuel cell stack 10 to derive an anode impedance R2, a step (S54) of comparing the anode impedance R2 derived in the step S53 and the anode impedance $R_1$ derived in the step S52 with each other, a step (S55) of increasing the second frequency $\omega_2$ by a predetermined reference value ($\Delta\omega$) when a difference between the anode impedance R2 derived in the step S53 and the anode impedance $R_1$ derived in the step S52 exceeds a predetermined reference ratio $\alpha$, and a step (S56) of maintaining the second frequency $\omega_2$ as it is when the difference between the anode impedance R2 derived in the step S53 and the anode impedance $R_1$ measured in the step S52 is the reference ratio or less.

In the step SM, the frequency control condition is not particularly limited. For example, the frequency control condition may be a case in which performance of the fuel cell stack 10 is further deteriorated by a predetermined reference ratio as compared with when the water-containing state of the fuel cell stack 10 is previously diagnosed or a case in which a vehicle or another apparatus in which the fuel cell system 1 is traveled by a predetermined reference distance or more after the water-containing state of the fuel cell stack 10 is previously diagnosed.

The case in which the performance of the fuel cell stack 10 is deteriorated indicates a case in which an output voltage of the fuel cell stack 10 is decreased in the same driving environment. The reference ratio is not particularly limited. For example, the reference ratio may be 1%.

The reference distance is not particularly limited. For example, the decision distance may be 5000 km.

In the step S52, the controller 80 may control the driving of the air supplying device 40, the air supplying valve 50, and the air discharging valve 70, and the like, so that the air is supplied to the cathode 18 by the predetermined standard flow rate or the pressure of the cathode 18 is controlled to be the predetermined standard pressure, and at the same time, control driving of the impedance measurer 190 so that the second AC signal having the second frequency $\omega_2$ is applied to the fuel cell stack 10. In this case, the impedance measurer 190 may derive the anode impedance $R_1$ on the basis of an environment condition of the cathode 18 controlled as described above. Since a method for deriving the anode impedance $R_1$ in the step S52 is the same as the method for deriving the anode impedance MFR in the step S14 described above, a detailed description therefor will be omitted.

In the step S53, the controller 80 may control the driving of the air supplying device 40, the air supplying valve 50, and the air discharging valve 70, and the like, so that the air is supplied to the cathode 18 by a flow rate further decreased by a predetermined reference ratio as compared with the standard flow rate or the pressure of the cathode 18 is controlled to be a pressure further decreased by a predetermined reference ratio as compared with the standard pressure, and at the same time, control driving of the impedance measurer 190 so that the second AC signal having the second frequency $\omega_2$ is applied to the fuel cell stack 10. In this case, it is preferable that the controller 80 supplies the air to the cathode 18 by the flow rate further decreased by the reference ratio as compared with the standard flow rate in the step S53 in the case in which the air is supplied to the cathode 18 by the standard flow rate in the step S52. In addition, it is preferable that the controller 80 controls the pressure of the cathode 18 to be the pressure further decreased by the reference ratio as compared with the standard pressure in the step S53 in the case in which the pressure of the cathode 18 is controlled to be the standard pressure in the step S52. In this case, the impedance measurer 190 may derive the anode impedance R2 on the basis of an environment condition of the cathode 18 controlled as described above. Since a method for deriving the anode impedance R2 in the step S53 is the same as the method for deriving the anode impedance MFR in the step S14 described above, a detailed description therefor will be omitted.

In the step S54, the controller 80 may compare the anode impedance R2 derived in the step S53 and the anode impedance R1 derived in the step S52 with each other.

In order to accurately derive the anode impedance MFR, a frequency at which the cathode impedance $Z_C$ substantially becomes S2 needs to be determined to be the second frequency $\omega_2$. Generally, when the flow rate of air supplied to the cathode 18 is decreased or the pressure of the cathode 18 is decreased, reactivity of a reduction reaction generated in the cathode 18 is hindered. Therefore, the cathode impedance $Z_C$ becomes higher by a predetermined ratio in the case in which the air is supplied to the cathode 18 by the flow rate further decreased by the reference ratio as compared with the standard flow rate or the pressure of the cathode 18 is controlled to be the pressure further decreased by the reference ratio as compared with the standard pressure than in the case in which the air is supplied to the cathode 18 by the standard flow rate or the pressure of the cathode 18 is controlled to the standard pressure. For convenience of explanation, hereinafter, the case in which the air is supplied to the cathode 18 by the standard flow rate or the pressure of the cathode 18 is controlled to the standard pressure will be called a case in which the air is supplied to the cathode 18 in a standard condition, and the case in which the air is supplied to the cathode 18 by the flow rate further decreased by the reference ratio as compared with the standard flow rate or the pressure of the cathode 18 is controlled to be the pressure further decreased by the reference ratio as compared with the standard pressure will be called a case in which the air is supplied to the cathode 18 in a reactivity decrease condition.

In the case in which the frequency control condition described above is satisfied, there is a probability that the frequency at which the cathode impedance $Z_C$ substantially becomes 0 m$\Omega \cdot$cm$^2$ will be changed due to deterioration of the cathode 18 or other causes as compared with when the water-containing state of the fuel cell stack 10 is previously measured. When the frequency at which the cathode impedance $Z_C$ substantially becomes 0 m$\Omega \cdot$cm$^2$ is not changed after the water-containing state of the fuel cell stack 10 is previously diagnosed, the anode impedance R1 derived in a state in which the air is supplied to the cathode 18 in the standard condition and the anode impedance R2 derived in a state in which the air is supplied to the cathode 18 in the reactivity decrease condition need to have the same value. Therefore, it may be decided whether or not the frequency at which the cathode impedance $Z_C$ substantially becomes 0 m$\Omega \cdot$cm$^2$ is changed after the water-containing state of the fuel cell stack 10 is previously diagnosed, on the basis of a comparison result between the anode impedance R1 derived in the step S52 and the anode impedance R2 derived in the step S53.

In the step S55, the controller 80 may increase the second frequency $\omega_2$ by the predetermined reference value when the difference between the anode impedance R2 derived in the step S53 and the anode impedance R1 derived in the step S52 exceeds the predetermined reference ratio α. That is, the controller 80 may decide the frequency at which the cathode impedance $Z_C$ substantially becomes 0 mΩ·cm² is changed due to the deterioration of the cathode 18 or other causes and increase the second frequency $\omega_2$ by the reference value ($\Delta\omega$). The reference value ($\Delta\omega$) is not particularly limited. For example, the reference value ($\Delta\omega$) may be 20 Hz. As illustrated in FIG. 12, after the second frequency $\omega_2$ is controlled as described above, the step S52 and the step S53 are preferably again performed, but are not limited thereto.

In the step S56, the controller 80 may maintain the second frequency $\omega_2$ as it is when the difference between the anode impedance R2 derived in the step S53 and the anode impedance $R_1$ derived in the step S52 is the reference ratio α or less. That is, the controller 80 decides that factors that may change the frequency which the cathode impedance $Z_C$ substantially becomes 0 mΩ·cm², such as the deterioration of the cathode 18, and the like, are not generated, and maintains the second frequency $\omega_2$ as it is.

According to the step S50, generation of an error in a measurement result of the anode impedance MFR due to the deterioration of the cathode 18 or other causes may be prevented to more accurately diagnose the water-containing state of the fuel cell stack 10.

The present disclosure relates to the method for diagnosing a water-containing state of a fuel cell stack, and has the following effects.

First, according to the present disclosure, the electrolyte membrane impedance, the anode impedance, and the cathode impedance may be individually calculated using characteristics that the electrolyte membrane impedance, the anode impedance, and the cathode impedance are relatively changed depending on frequency components, and the water-containing state of the fuel cell stack may be precisely diagnosed for each of the detailed types using the electrolyte membrane impedance, the anode impedance, and the cathode impedance.

Second, according to the present disclosure, the water content of the fuel cell stack may be controlled depending on the water-containing state of the fuel cell stack and the driving aspect of the fuel cell system to improve the performance and the durability of the fuel cell stack, the cold start performance of the fuel cell system, and the like.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for diagnosing a water-containing state of a fuel cell stack, comprising:
    a step (A) of applying, by an impedance measurer, an alternating current (AC) signal having a predetermined frequency to the fuel cell stack to calculate each of an electrolyte membrane impedance, an anode impedance, and a cathode impedance from an output voltage and an output current of the fuel cell stack corresponding to the AC signal; and
    a step (B) of diagnosing, by a controller, the water-containing state of the fuel cell stack on the basis of the electrolyte membrane impedance, the anode impedance, and the cathode impedance,
    wherein the step (B) includes:
        a step (B1) of deciding whether or not the electrolyte membrane impedance exceeds a predetermined reference electrolyte membrane impedance;
        a step (B2) of deciding that the fuel cell stack is in a dry state in the case in which the electrolyte membrane impedance exceeds the predetermined reference electrolyte membrane impedance;
        a step (B3) of deciding whether or not a summed impedance calculated by summing the anode impedance and the cathode impedance exceeds a predetermined reference summed impedance in the case in which the electrolyte membrane impedance is the predetermined reference electrolyte membrane impedance or less;
        a step (B4) of deciding that the fuel cell stack is in a flood state in the case in which the summed impedance exceeds the predetermined reference summed impedance; and
        a step (B5) of deciding that the fuel cell stack is in an optimal state in the case in which the summed impedance is the predetermined reference summed impedance or less.

2. The method according to claim 1, wherein the step (A) includes a step (A1) of measuring a first output voltage and a first output current of the fuel cell stack in a state in which a first AC signal having a predetermined first frequency is applied to the fuel cell stack and setting a first impedance of the fuel cell stack derived from the first output voltage and the first output current to the electrolyte membrane impedance.

3. The method according to claim 2, wherein the first frequency is determined so that a ratio of the anode impedance and the cathode impedance to the first impedance is less than a predetermined reference ratio.

4. The method according to claim 2, wherein the step (A) further includes a step (A2) of measuring a second output voltage and a second output current of the fuel cell stack in a state in which a second AC signal having a second frequency lower than the first frequency is applied to the fuel cell stack and setting an impedance value calculated by subtracting the electrolyte membrane impedance derived in the step (A1) from a second impedance of the fuel cell stack derived from the second output voltage and the second output current to the anode impedance.

5. The method according to claim 4, wherein the second frequency is determined so that a ratio of the cathode impedance to the second impedance is less than a predetermined reference ratio.

6. The method according to claim 5, further comprising, before the step (A2), a step (C) of controlling the second frequency so that the ratio of the cathode impedance to the second impedance is less than the reference ratio,
    wherein the step (C) includes:
        a step (C1) of supplying air to the cathode by a predetermined standard flow rate or controlling a pressure of the cathode to be a predetermined standard pressure and at the same time, applying the second AC signal having the second frequency to the fuel cell stack to measure the anode impedance;
        a step C2) of supplying the air to the cathode by a flow rate less than the standard flow rate or controlling the pressure of the cathode to be a pressure lower than the standard pressure and at the same time, applying the second AC signal having the second frequency to the fuel cell stack to measure the anode impedance; and
        a step (C3) of increasing the second frequency by a predetermined reference value when a difference between the anode impedance measured in the step (C2) and the anode impedance measured in the step (C1) exceeds a predetermined reference ratio.

7. The method according to claim 6, wherein in the step (C3), the second frequency is maintained as it is when the difference between the anode impedance measured in the step (C2) and the anode impedance measured in the step (C1) is the reference ratio or less.

8. The method according to claim 4, wherein the step (A) further includes a step (A3) of measuring a third output voltage and a third output current of the fuel cell stack in a state in which a third AC signal having a third frequency lower than the second frequency is applied to the fuel cell stack and setting an impedance value calculated by subtracting the electrolyte membrane impedance derived in the step (A1) and the anode impedance derived in the step (A2) from a third impedance of the fuel cell stack derived from the third output voltage and the third output current to the cathode impedance.

9. The method according to claim 8, wherein the third frequency is determined so that a ratio of the cathode impedance to the third impedance is a predetermined reference ratio or more.

10. The method according to claim 1, wherein the step (B2) is performed by deciding that the anode is in a dry-anode bias state in the case in which the anode impedance exceeds a predetermined reference anode impedance and the cathode impedance is a predetermined reference cathode impedance or less.

11. The method according to claim 1, wherein the step (B2) is performed by deciding that the cathode is in a dry-cathode bias state in the case in which the anode impedance is a predetermined reference anode impedance or less and the cathode impedance exceeds a predetermined reference cathode impedance.

12. The method according to claim 1, wherein the step (B4) is performed by deciding that the cathode is in a flood-cathode bias state in the case in which the anode impedance exceeds a predetermined reference anode impedance and the cathode impedance is a predetermined reference cathode impedance or less.

13. The method according to claim 1, wherein the step (B4) is performed by deciding that the anode is in a flood-anode bias state in the case in which the anode impedance is a predetermined reference anode impedance or less and the cathode impedance exceeds a predetermined reference cathode impedance.

* * * * *